US012577111B2

(12) United States Patent
Aich et al.

(10) Patent No.: US 12,577,111 B2
(45) Date of Patent: Mar. 17, 2026

(54) GRAPHENE-BIOPOLYMER COMPOSITIONS AND METHODS OF MAKING AND USING SAME

(71) Applicant: The Research Foundation for The State University of New York, Amherst, NY (US)

(72) Inventors: Nirupam Aich, Tonawanda, NY (US); Chi Zhou, Getzville, NY (US); Arvid Masud, Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 690 days.

(21) Appl. No.: 17/995,301

(22) PCT Filed: Mar. 30, 2021

(86) PCT No.: PCT/US2021/025005
§ 371 (c)(1),
(2) Date: Sep. 30, 2022

(87) PCT Pub. No.: WO2021/202614
PCT Pub. Date: Oct. 7, 2021

(65) Prior Publication Data
US 2023/0166975 A1 Jun. 1, 2023

Related U.S. Application Data

(60) Provisional application No. 63/002,082, filed on Mar. 30, 2020.

(51) Int. Cl.
*C01B 32/182* (2017.01)
*B33Y 70/10* (2020.01)
(Continued)

(52) U.S. Cl.
CPC ............ *C01B 32/182* (2017.08); *B33Y 70/10* (2020.01); *B33Y 80/00* (2014.12); *C08G 73/0672* (2013.01)

(58) Field of Classification Search
None
See application file for complete search history.

(56) References Cited

U.S. PATENT DOCUMENTS

2006/0234871 A1 10/2006 Dalrymple et al.
2016/0177109 A1 6/2016 Hendricks et al.
(Continued)

FOREIGN PATENT DOCUMENTS

CN 106268546 A * 1/2017 ............. B01J 20/20
WO 2019182627 A1 9/2019
WO 2019209493 A1 10/2019

OTHER PUBLICATIONS

Sui et al, CN 106268546 A, English Translation from FIT (Year: 2017).*
(Continued)

*Primary Examiner* — Colin W. Slifka
(74) *Attorney, Agent, or Firm* — Hodgson Russ LLP

(57) ABSTRACT

Provided are printable gel or hydrogel compositions, methods of making printable gel or hydrogel compositions, uses of the printable gel or hydrogel compositions, objects formed from the printable gel or hydrogel compositions, and methods of using those objects. The printable gel or hydrogel compositions may be formed from a graphene component, a polymer component, and a carrier. The printable gel or hydrogel compositions may be used as inks in additive manufacturing techniques to 3D print a 3D object. The 3D object may be freeze-dried to form an aerogel. The aerogel may be used to remove contaminants from aqueous samples.

11 Claims, 18 Drawing Sheets

(51) Int. Cl.
   *B33Y 80/00* (2015.01)
   *C08G 73/06* (2006.01)

(56) References Cited

U.S. PATENT DOCUMENTS

| | | |
|---|---|---|
| 2016/0332136 A1 | 11/2016 | Zhang et al. |
| 2018/0185818 A1 | 7/2018 | Kim et al. |
| 2019/0038809 A1 | 2/2019 | Kang et al. |

OTHER PUBLICATIONS

Yin, Yingying et al., A durable mesh decorated with polydopamine-graphene oxide for highly efficient oil-water mixture separation, Applied Surface Science, Feb. 15, 2019, vol. 479, pp. 351-359.

* cited by examiner

GRAPHENE-BIOPOLYMER COMPOSITIONS AND METHODS OF MAKING AND USING SAME

CROSS REFERENCE TO RELATED APPLICATION

This application claims priority to U.S. Provisional Application No. 63/002,082, filed Mar. 30, 2020, the entire disclosure of which is incorporated herein by reference.

BACKGROUND OF THE DISCLOSURE

Graphene, a two-dimensional (2D) planar structure of monolayer carbon atoms, has been studied extensively in the recent times for its unique electrical, optical, thermal and mechanical properties. These outstanding physicochemical properties of graphene have instigated wide-spread research interest in realizing its potential in the fields of electronics, sensors, biomedicine, catalysis, environmental remediation and so forth. High surface area, tunable hydrophobicity, Π-Π interaction, and easy surface functionalization ability have made graphene a potential candidate for environmental remediation applications, especially in removing contaminants from water. However, one of the major barriers that exists for graphene's large-scale application as a nano-adsorbent is in its high colloidal stability in water, making recovery of graphene nanosheets from water treatment processes quite difficult. To alleviate such issues, three-dimensional (3D) macroscopic structures known as aerogels made from self-assembled 2D graphene nanosheets have recently emerged as promising nano-adsorbents. These graphene-based 3D macrostructures with tunable porosity, geometry, and surface chemistry can provide interconnected pores for high mass transport and high adsorption capacity for diverse contaminants, are ultralight, offer the provisions to be regenerated and recycled, and eliminate the risks of nanoparticle release.

The conventional synthesis routes for macroscopic 3D graphene hydrogel/aerogel structures include hydrothermal/solvothermal reduction, in-situ chemical reduction, direct cross-linking, template guided (e.g., metallic foam) deposition and freeze casting. All these synthesis routes rely on self-assembly or gelation of a precursor suspension, which impedes the ability to control the macroscopic architecture of the synthesized graphene monoliths. Template-guided deposition and freeze casting methods can demonstrate some control on the overall size and shape of the synthesized monolith; however, the architectural complexity and scalability of these methods are compromised due to their template-mediated processes. Additionally, as these self-assembly and cross-linking mediated processes are dependent on the precursor chemical composition, the flexibility of functionalizing/hybridizing these graphene macro-assemblies with diversified material is limited. It is a significant challenge to come up with a tailorable and scalable assembly method for fabricating these 3D graphene monoliths with flexibility in macroscopic architecture and provision for diversified material loading, which can enhance the merit of these graphene hierarchical structures for specific applications.

3D printing or additive manufacturing has emerged as an enabling technology for the continuous fabrication of highly complex physical structures from computer-aided design through bottom-up synthesis process. Particularly, direct ink writing (DIW), a robust, low-cost and scalable 3D printing technique, employs continuous and robotic extrusion of layer-by-layer ink material to fabricate a pre-designed 3D product by regulating the motion of the micro-extruder and the printing stage in three-axis. The unique ability of 3D printing to provide scalability, flexibility of architectures, and design-mediated functionality is introduced its application in water and wastewater treatment processes e.g., membranes and filters, biological growth media, and chemical and photocatalytic-reactors. Few recent reports also proposed nanoscale adsorbents such as metal-organic framework and nanoscale carbon nitride ($C_3N_4$) for water contaminant removal.

Among the various 3D printing techniques, direct ink writing (DIW) offers material flexibility, low-cost and robust printing technique which employs continuous and robotic extrusion of ink material in a layer-by-layer scheme into a pre-designed 3D structure by regulating the motion of a micro-extruder and printing stage in three-axes. However, the biggest challenge of DIW printing is to fabricate a gel-based viscoelastic ink which has shear thinning behavior. In order to utilize a DIW printing technique for graphene-based aerogels, a non-Newtonian viscoelastic ink needs to be formulated which can be extruded through the micro-nozzle under applied pressure yet retaining its shape through rapid pseudo-plastic recovery once extruded from the micro-nozzle adhering to the previous layer. The printed structure should also retain the liquid phase solvent (unlike the fused deposition modelling printing technique), which can be removed with subsequent freeze-drying or supercritical drying ($CO_2$) processes to resist the collapse of the microscopic porous structure and provide a ultra-light aerogel structure.

DIW 3D printing has been recently used to fabricate graphene-based aerogel structures for different applications, including supercapacitors, batteries, biomedical and thermal devices. These studies showed the ability of 3D printing to fabricate graphene-based aerogels with controllable macro-architectures up to sub-millimeter precision yet with hierarchical porous structures, which cannot be achieved by conventional self-assembly processes. Even with such promising advantages, no studies have presented the applicability of 3D-printed graphene-based aerogels for water treatment. The major challenge remains in the preparation of a graphene-based ink that has both the appropriate viscoelasticity and shear-thinning properties required for achieving effective DIW 3D printing. Many times, to achieve this, ultra-high concentrations (≥80 mg/mL) of graphene ink is used—which can cause agglomeration and inhomogeneity within the graphene network, and thus, compromise the inherent graphene properties. Furthermore, the printed graphene-based aerogel needs to hold its structural integrity in aqueous media and perform water contaminant adsorption.

SUMMARY OF THE DISCLOSURE

The present disclosure provides compositions, methods of making compositions, and uses of compositions. Also, provided are three-dimensional objects and methods of making three-dimensional objects.

In an aspect, the present disclosure provides compositions. The compositions comprise a graphene component, a polymer component, and a carrier. The compositions may be hydrogels. Non-limiting examples of compositions and methods of making the compositions are provided herein. In various examples, a composition is made by a method of the present disclosure. The compounds may be used as to make 3D objects using additive manufacturing methods.

In an aspect, the present disclosure provides methods of making compositions of the present disclosure. The methods can be used to make compositions of the present disclosure. Non-limiting examples of methods of making compositions of the present disclosure are provided herein.

In an aspect, the present disclosure provides three-dimensional objects. A three-dimensional objects may comprise a graphene component, a polymer component, and, optionally, a carrier. A three-dimensional object may comprise all or substantially all (e.g., 90% more, 95% or more, 99% or more, 99.9% or more of each of the components or carrier, individually) of the graphene component, the polymer component, and, optionally, the carrier used to make the object. A three-dimensional object may have various forms. A three-dimensional object may define a plurality of voids. All of the carrier or substantially all (e.g., 90% more, 95% or more, 99% or more, 99.9% or more of carrier) of the carrier used to make the object may be removed from the object. A three-dimensional object may be an aerogel. In various examples, a three-dimensional object is made by a method of the present disclosure. Non-limiting examples of compositions are provided herein.

In an aspect, the present disclosure provides uses of the three-dimensional objects of the present disclosure. Non-limiting examples of uses of the three-dimensional objects are provided herein.

A method of sample purification may use one or more three-dimensional object(s) of the present disclosure. A sample may be an aqueous (e.g., water) sample or a gaseous sample.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
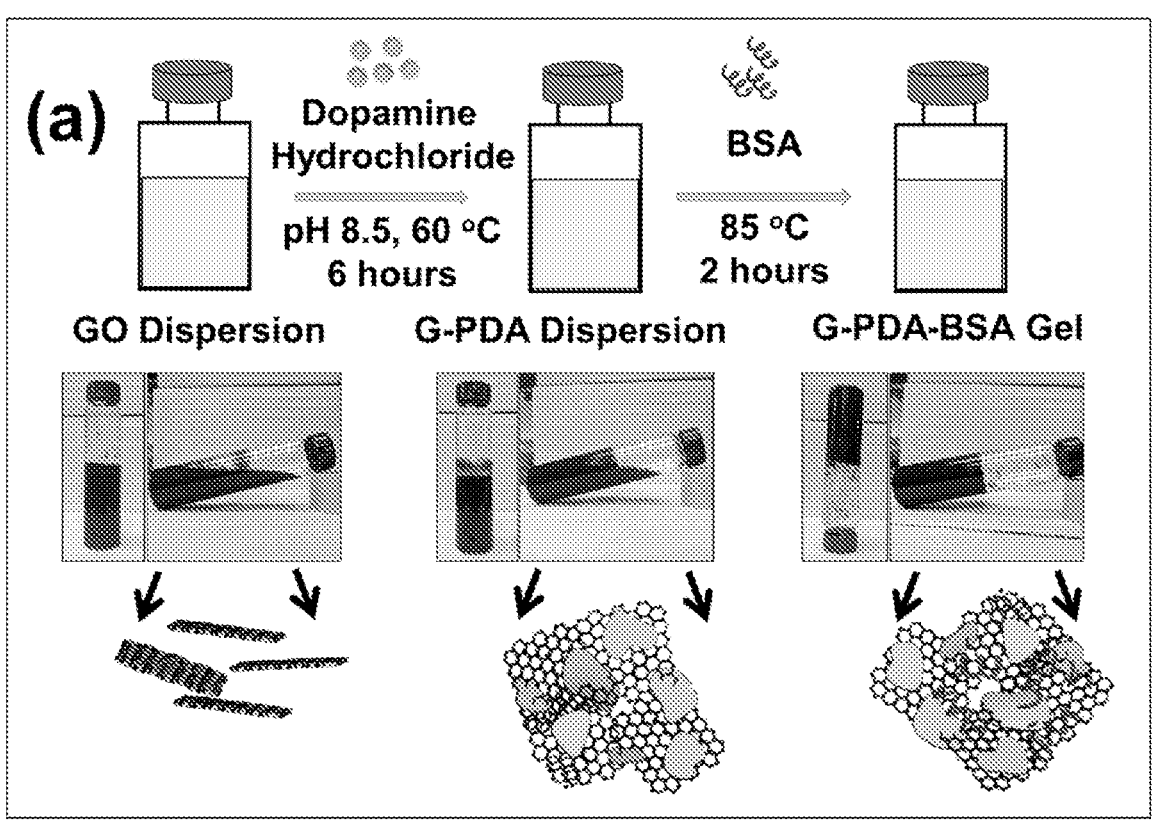
FIG. 1 shows (a) a schematic of different steps for synthesis of G-PDA-BSA viscous gel and (b) plot of apparent viscosity as a function of shear rate for GO, G-PDA, and G-PDA-BSA dispersions.
Figure 1:
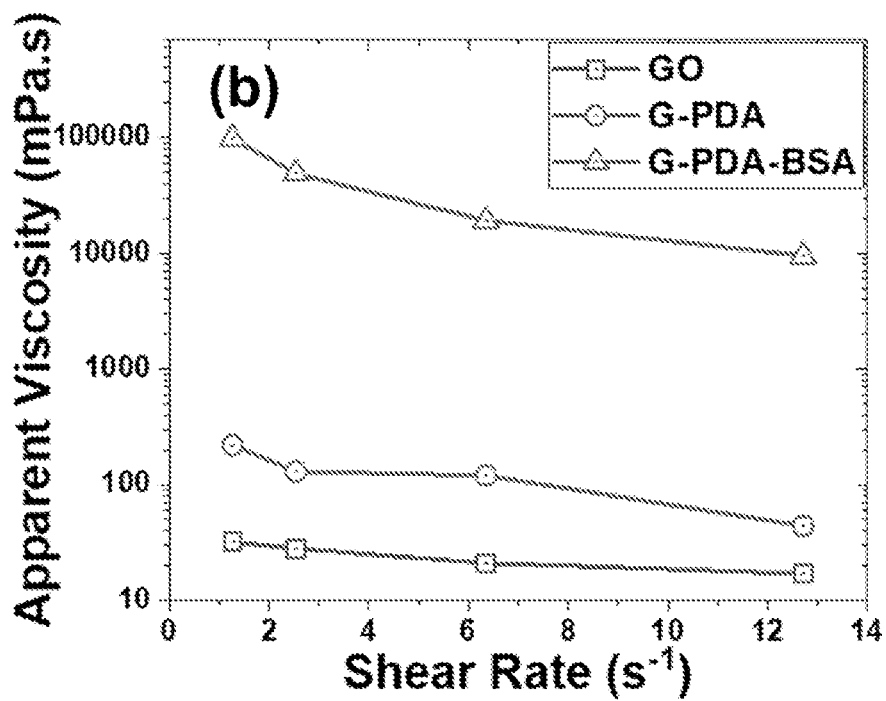

Although claimed subject matter may be described in terms of certain examples, other examples, including examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value).

The present disclosure provides compositions, methods of making compositions, and uses of compositions. Also, provided are three-dimensional objects and methods of making three-dimensional objects. Non-limiting examples of compositions and methods of making the compositions are provided herein. In various examples, a composition is made by a method of the present disclosure. The compositions may be used as to make 3D objects using additive manufacturing methods.

In an aspect, the present disclosure provides compositions. The compositions comprise a graphene component, a polymer component, and a carrier. The compositions may be gels or hydrogels. The compositions may be referred to as printable gel compositions. Non-limiting examples of compositions and methods of making the compositions are provided herein. In various examples, a composition is made by a method of the present disclosure. The compositions may be used as to make 3D objects using additive manufacturing methods.

The polymer component may comprise various polymers. For example, the polymer component is one or more polymers. In various examples, the printable gel composition comprises just polydopamine. In various other examples, the printable gel composition further comprises one or more additional polymers. In various examples, the composition comprises at least two polymers (e.g., only two polymers). The additional one or more polymers are chosen from other polydopamines, alginates, chitosans, bovine serum albumin (BSA), and the like, and combinations thereof. In various examples, the one or more additional polymers is BSA. In various examples, there are two polymers and the two polymers are polydopamine and BSA. The total concentration of all the polymers may be 8-12 weight percent (based on the total weight of the composition), including every 0.01 weight percent value and range therebetween. For example, when just PDA is present, the total polymer concentration is 8-12 weight percent. When an additional polymer, such as, for example, BSA, the concentration of BSA may be 7.5-8 weight percent (based on the total weight of the composition), including every 0.01 weight percent value and range therebetween and the concentration of polydopamine is 1-1.5 weight percent (based on the total weight of the composition), including every 0.01 weight percent value and range therebetween.

Various carriers may be used to prepare the compositions. In various examples, the compositions is a hydrogel and the carrier is water. The water may be buffered. Various buffers are known in the art. For example, the water is buffered with tris(hydroxymethyl)aminomethane (TRIS) hydrochloride. The pH of the water may be 7.5-9, including every 0.1 pH value and range therebetween. In various other examples, the carrier is chosen from an organic solvent, such as, for example, polar aprotic solvents (e.g., dimethylformamide (DMF), N-methyl-2-pyrrolidone (NMP), and the like, and combinations thereof), polar protic solvents (e.g., various alcohols and combinations thereof), deep eutectic solvents, ionic liquids, and the like, and combination thereof. The carrier may be water, an organic solvent, or a mixture thereof.

The composition may comprise various graphene components. The graphene component may be single layer or multilayered. Non-limiting examples of graphene components include single layer graphene, multilayer graphene, single layer graphene oxide, multilayer graphene oxide, single layer surface-modified graphene oxide, multilayer surface-modified graphene oxide, and combinations thereof. The graphene component is present at various concentrations. For example, the graphene component is present at 0.5-5 weight percent (based on the total weight of the composition), including every 0.01 value and range therebetween. The graphene component may be reduced or partially reduced graphene. The reduced or partially reduce graphene may be thermally or chemically reduced. The graphene component may be dispersed in the carrier (e.g., water).

At least one of the polymers may be disposed or bound to at least a portion of a surface of the graphene component. In various examples, one or more of the polymers may be formed in situ. For example, a polymer may be bound to the graphene component via one or more non-covalent interactions (e.g., hydrogen bonding, π-π interactions, and the like, and combinations thereof) and/or via covalent interactions (e.g., covalent bonds). For example, the polydopamine may be formed in situ via oxidative polymerization of dopamine. As the dopamine polymerizes, the aryl groups of the polydopamine non-covalently interact with the aryl groups of the graphene component via π-π interactions. In various examples, when there are two polymers and BSA is one of the polymers, the BSA may be covalently attached to the polydopamine and/or the graphene component (e.g., via Michael-type and Schiff base-type reactions). In various examples, the BSA is partially denatured such that its β-sheet content is The gel or hydrogel may have desirable viscosity. The viscosity of the gel or hydrogel may be a free standing gel or hydrogel (e.g., a rigid gel or hydrogel). For example, the viscosity of the gel or hydrogel is such that it may be used in additive (e.g., 3D) printing techniques. The minimum viscosity of the gel or hydrogel may be at least 10,000, at least 20,000, at least 30,000, at least 40,000, at least 50,000, at least 100,000, at least 200,000, at least 300,000, at least 400,000, at least 500,000, at least 600,000, at least 700,000, at least 800,000, at least 900,000, or at least 1,000,000 mPa·s. In other examples, the minimum viscosity of the gel or hydrogel is 10,000, 20,000, 30,000, 40,000, 50,000, 100,000, 200,000, 300,000, 400,000, 500,000, 600,000, 700, 000, 800,000, 900,000, or 1,000,000 mPa·s. In various examples, the gel or hydrogel has a minimum viscosity of 10,000 mPa·s.

The composition may further comprise one or more nanoparticles. A portion of the nanoparticles may be disposed on a portion of a surface of the graphene component. Various nanoparticles may be used. Non-limiting examples of nanoparticles include metal nanoparticles, metal oxide nanoparticles, and the like, and combinations thereof. The nanoparticles may be redox active nanoparticles, photocatalysts, Noble metal catalysts, transition metals, rare earth metals, or multimetallic nanoparticles. Non-limiting examples of redox active nanoparticles include: iron (Fe) nanoparticles, magnetite ($Fe_3O_4$) nanoparticles, hematite ($Fe_2O_3$) nanoparticles, which may be made, e.g., in situ, using one or more iron salts, such as, for example, $FeCl_3$, $FeSO_4$, $Fe_2(SO_4)_3$, and the like. Non-limiting examples of photocatalysts include: titanium dioxide ($TiO_2$) nanoparticles, zinc oxide (ZnO) nanoparticles, which may be made, e.g., in situ, using one or more titanium or zinc salts, such as, for example, titanium alkoxides, organozinc salts (e.g., zinc acetate dihydrate and the like). Non-limiting examples of Noble metal catalysts include: silver (Ag) nanoparticles, gold (Au) nanoparticles, platinum (Pt) nanoparticles, which may be made, e.g., in situ, using one or more iron salts, such as, for example, silver nitrate, chloroauric acid, chloroplatinic acid; metal oxides: such as, for example, copper oxide (CuO), cerium oxide ($CeO_2$), which may be made, e.g., in situ, using one or more copper salts (e.g., copper chloride, nitrate, sulphate salts, and the like, and combinations thereof), cerium salts (e.g., ceric ammonium nitrate or ceric nitrate). Non-limiting examples of mulitimetallic nanoparticles include: Fe/Ni nanoparticles, Au/Ni nanoparticles, Pt/Ni nanoparticles, Fe/Pd nanoparticles, Fe/Pt nanoparticles, Au/CeO2 nanoparticles, Au/ZnO nanoparticles, Au/$TiO_2$ nanoparticles, Fe/$TiO_2$ nanoparticles, which may be made, e.g., in situ, using one or more iron salts described above present as mixtures or used sequentially. The metal nanoparticles and/or metal oxide nanoparticles may be single atoms (e.g., single-atom catalysts and the like), have a size (e.g., a longest dimension, which may be a diameter) of 1-500 nm (e.g., 1-10 nm, 1-20 nm, 1 nm to 100 nm, 10-100 nm, 1 nm to 200 nm, or 10-200 nm) (depending on the agglomeration), including all 0.1 nm values and ranges therebetween. The nanoparticles may or may not be agglomerated. The nanoparticles may be present at a concentration of 1-10 weight percent (based on the total weight of the composition), including every 0.01 weight percent value and range therebetween.

In an aspect, the present disclosure provides methods of making compositions of the present disclosure. The methods can be used to make compositions of the present disclosure. Non-limiting examples of methods of making compositions of the present disclosure are provided herein.

For example, a method comprises contacting a graphene component; a polymer component (which may be a first polymer and a second polymer); and a carrier. In various examples, one or more of the polymers is formed in situ. A method may produce a composition comprising metal nanoparticles and/or metal oxide nanoparticles. In various examples, preformed/presynthesized metal and/or metal oxide nanoparticles are contacted with the graphene component; the polymer component (which may be a first polymer and, optionally, one or more additional polymers (e.g., a second polymer, such as, for example BSA)); and the carrier. In various other examples, the graphene components are preformed/presynthesized graphene-metal or graphene-metal oxide nanocomposites. In various other examples, one or more precursors for metal or metal oxide nanoparticles are contacted with the graphene component; the polymer component (which may be a first polymer and a second polymer); and the carrier and the methods further comprise conversion (e.g., thermal conversion, which may be carried out in new distinct heating step or result from an existing during the carrier removal (e.g., freeze-drying) or annealing processes) of the precursor(s) to metal or metal oxide nanoparticles. In various other examples, the nanoparticles are added to the composition in a post composition formation (e.g., after gel formation, after aerogel formation, etc.), such as, for example, dip-coating the composition (e.g., hydrogel, aerogel, etc.) in a solution of metal or metal oxide precursor(s) and then converting the precursor(s) (e.g., reducing the precursor(s)) to metal and metal oxide nanoparticles.

In various examples, the graphene component is contacted with each polymer sequentially. For example, the graphene component is contacted with a first polymer (or a monomer that polymerizes to form the first polymer). After the first polymer is contacted with the graphene component, optionally, a second polymer may be contacted with the graphene component, and so on.

The dispersion comprising the graphene component, carrier (e.g., water), polydopamine, and, optionally, one or more additional polymers may be heated or maintained at various temperatures for various times during the formation of the composition. For example, the contacting step is at a temperature of 70-90° C. (e.g., about 85° C.) and/or for a selected period of time (e.g., 0.5-3 hours or about 1 hour). At this stage, the composition may be a gel or hydrogel composition. Without intending to be bound by any particular theory, it is considered that the heating results in crosslinking of at least a portion of or all of the polymer component or crosslinking at least a portion of or all of one or more of the polymer(s) of the polymer component to form a gel or hydrogel.

In an aspect, the present disclosure provides three-dimensional objects. A three-dimensional object may comprise a graphene component, a polymer component, and, optionally, a carrier. The three-dimensional object may be an aerogel. A three-dimensional object may comprise all or substantially all (e.g., 90% more, 95% or more, 99% or more, 99.9% or more of each of the components or carrier, individually) of the graphene component, the polymer component (e.g., polydopamine and, optionally, one or more additional polymers chosen from other polydopamines, alginates, chitosans, bovine serum albumin (BSA), and the like, and combinations thereof), and, optionally, the carrier used to make the object. A three-dimensional object may have various forms and be free standing. In various examples, the three-dimensional (3D) object is a monolith. A three-dimensional object may define a plurality of voids. All of the carrier or substantially all (e.g., 90% more, 95% or more, 99% or more, 99.9% or more of carrier) of the carrier used to make the object may be removed from the object. A three-dimensional object may be an aerogel. In various examples, a three-dimensional object is made by a method of the present disclosure. Non-limiting examples of compositions are provided herein.

The three-dimensional object may define a plurality of voids. In various examples, the voids are internal/encapsulated, have at least one external opening, or a combination thereof. At least a portion of or all of the voids may be interconnected. The voids may be referred to as pores. A three-dimensional object may be macroporous. A three-dimensional object may have interconnected macropores, at least a portion or all of which may be interconnected and/or may have a size (e.g., one or more dimension) of 50-500 microns, including all 0.1 micron values and ranges therebetween, and/or pores disposed between individual graphene components (and may or may not be interconnected), which may have a size range (e.g., one or more dimension of) of 500 nanometers to 5 microns, including all integer nanometer values and ranges therebetween. Without intending to be bound by any particular theory, it is considered that the voids (or a portion of the voids) are produced by removal or all or substantially all of the carrier (e.g., water) (e.g., by a freeze drying process) and/or interaction between the graphene component and polymer(s).

The three-dimensional object may be formed by a method comprising additive or advanced manufacturing. Examples, include 3D printing the object, followed by removing at least a portion of or all of the carrier (e.g., water) from the printed object. Removing the carrier may be by freeze-drying, supercritical extraction, vacuum drying (which may be carried out with heating), or the like.

A device may comprise the three-dimensional object. Examples of devices include, but are not limited to, filtration devices, macroporous adsorbent, flow-through reactor, water treatment device, and the like.

In an aspect, the present disclosure provides uses of the three-dimensional objects of the present disclosure. Non-limiting examples of uses of the three-dimensional objects are provided herein.

A method of sample purification may use one or more three-dimensional object(s) of the present disclosure. A sample may be an aqueous (e.g., water) sample or a gaseous sample. Examples of samples include, but are not limited to, a wastewater sample (e.g., a municipal wastewater or storm water sample, industrial wastewater sample, storm water runoff, and the like), surface water, an industrial water sample (e.g., water used to make a commercial product, such as, for example, a reagent, a solvent, or the like), a municipal drinking water sample, a body of water (e.g., a salt-water body of water, such as, for example, an ocean, a sea, and the like, a fresh-water body of water, such as, for example, a lake, a pond, river, stream, or the like) or the like.

Various types of contaminants may be removed from the aqueous samples. Examples of contaminants are chosen from dyes, metals (which may be heavy metals), organic solvents, oil/petroleum products, organic contaminants, and the like, and combinations thereof. Non-limiting examples of dyes include methylene blue (MB), Evans blue (EB), and the like. Non-limiting examples of metals include Cr(IV), Pb(II), Cd(II), Cu(II), and the like. Non-limiting examples of organic solvents include alkanes (such as, for example, n-hexane, toluene, benzene, chloroform, and the like. Non-limiting examples of oil/petroleum products include kerosene, diesel, and the like. Non-limiting examples of organic contaminants include pharmaceuticals and personal care products (PPCPs), per- and polyfluoroalkyl substances (PFAS), polychloro biphenyls (PCBs), and the like.

In various examples, the method results in 50% or more, 60% or more, 70% or more, 80% or more, 90% or more, 95% or more, 99% or more, or 100% of the one or more contaminant(s) is/are removed from the sample. The amount of the one or more or all contaminant(s) can be quantified in the sample (before and/or after the contacting) by methods known in the art. In various examples, the amount of the one or more contaminant(s) or all of the contaminants are quantified in the sample (before or after the contacting) by one or more methods chosen from spectroscopic methods (such as, for example, UV-Visible spectroscopy, inductively coupled plasma-optical emission spectroscopy, high performance liquid chromatography, gas chromatography, fluorescence spectroscopy, liquid chromatography mass spectrometry, and the like), spectrometry methods, colorimetric methods, and the like, and combinations thereof.

The three-dimensional objects may be regenerated and used multiple times. The three-dimensional objects may be regenerated by (e.g., one or more contaminant(s) is/are removed from the one or more three-dimensional object(s)) by, for example, heating or desorbing in a regenerating solvent, such as, for example, an organic solvent (e.g., ethanol). A regenerated three-dimensional object is an object where a portion of or all of the contaminants have been removed or separated from the three-dimensional article.

The steps of the methods described in the various examples disclosed herein are sufficient to carry out the methods of the present disclosure. Thus, in an example, a method consists essentially of a combination of the steps of the methods disclosed herein. In another example, a method consists of such steps.

The following Statements describe various embodiments of the present disclosure.

Statement 1. A composition (which may be a 3D printable ink) comprising: a graphene component; a polymer component (which may comprise a first polymer and a second polymer); and a carrier. A composition may be a gel or hydrogel (e.g., at least a portion of a polymer of the polymer component is crosslinked or at least a portion of or all of one or more of the polymer(s) of the polymer component is crosslinked). At least a portion of or all of one or more of the polymer(s) of the polymer component may interact and/or be chemically bonded to at least a portion of the graphene component. At least a portion of or all of the composition (e.g., at least a portion of or all of one or more of the polymer(s) of the polymer component and/or at least a portion of or all of one or more of the graphene(s), graphene oxide(s), substituted-graphene(s) polymer(s) of the graphene component) may be negatively charged. A composition may further comprise a plurality of metal nanoparticles, metal oxide nanoparticles, or a combination thereof. At least a portion of or all of the metal nanoparticles and/or metal oxide nanoparticles may be disposed on at least a portion of or all of a surface or surfaces of the graphene component. The metal nanoparticles and/or metal oxide nanoparticles may be chemically bonded (e.g., ionically or covalently (optionally, via a liker)) bonded to a surface of the graphene component) and/or interact with the polymer component. The metal nanoparticles and/or metal oxide nanoparticles may comprise a plurality of different metals or metal oxides, respectively. The metal nanoparticles and/or metal oxide nanoparticles may be preformed and/or formed in situ. The metal nanoparticles and/or metal oxide nanoparticles may be catalysts (e.g., photocatalysts and the like). Non-limiting examples of metal oxide nanoparticles and metal oxide nanoparticles include redox active nanoparticles, such as, for example: iron (Fe) nanoparticles, magnetite ($Fe_3O_4$) nanoparticles, hematite ($Fe_2O_3$) nanoparticles, which may be made, e.g., in situ, using one or more iron salts, such as, for example, $FeCl_3$, $FeSO_4$, $Fe_2(SO_4)_3$, and the like; photocatalysis, such as, for example, titanium dioxide ($TiO_2$) nanoparticles, zinc oxide (ZnO) nanoparticles, which may be made, e.g., in situ, using one or more titanium or zinc salts, such as, for example, titanium alkoxides, organozinc salts (e.g., zinc acetate dihydrate and the like); Noble metal catalysts, such as, for example, silver (Ag) nanoparticles, gold (Au) nanoparticles, platinum (Pt) nanoparticles, which may be made, e.g., in situ, using one or more iron salts, such as, for example, silver nitrate, chloroauric acid, chloroplatinic acid; metal oxides: such as, for example, copper oxide (CuO), cerium oxide ($CeO_2$), which may be made, e.g., in situ, using one or more copper salts (e.g., copper chloride, nitrate, sulphate salts, and the like, and combinations thereof), cerium salts (e.g., ceric ammonium nitrate or ceric nitrate); and mulitimetallic nanoparticles, such as, for example, Fe/Ni nanoparticles, Au/Ni nanoparticles, Pt/Ni nanoparticles, Fe/Pd nanoparticles, Fe/Pt nanoparticles, Au/CeO$_2$ nanoparticles, Au/ZnO nanoparticles, Au/TiO$_2$ nanoparticles, Fe/TiO$_2$ nanoparticles, which may be made, e.g., in situ, using one or more iron salts described above present as mixtures or used sequentially. The metal nanoparticles and/or metal oxide nanoparticles may be single atoms (e.g., single-atom catalysts and the like), have a size (e.g., a longest dimension, which may be a diameter) of 1-500 nm (e.g., 1-10 nm, 1-20 nm, 1 nm to 100 nm, 10-100 nm, 1 nm to 200 nm, or 10-200 nm) (depending on the agglomeration), including all 0.1 nm values and ranges therebetween. The nanoparticles may or may not be agglomerated. In various examples, the metal nanoparticles and/or metal oxide nanoparticles are present at 1-10 weight percent (based on the total weight of the composition).

Statement 2. A composition according to Statement 1, wherein the graphene component is chosen from graphene (which may be single-layer or multi layered), graphene oxide (which may be single-layer or multi layered), surface-modified graphene oxide (which may be single-layer or multi layered), and the like, and combinations thereof. Without intending to be bound by any particular theory, it is considered that the graphene component provides desirable removal of contaminants from samples. Non-limiting examples of surface-modified graphene and/or surface-modified graphene oxide include those that are dispersible in a carrier. At least a portion of or all of the surface-modified graphene may be surface modified with metal nanoparticles and/or metal oxide nanoparticles. Without intending to be bound by any particular theory, it is considered that the surface-modified graphene provides desirable removal of contaminants from samples.

Statement 3. A composition according to Statements 1 or 2, wherein the graphene component is present in the composition at 0.5-5 (e.g., 2-3) weight percent (based on the total weight of the composition), including all 0.1 weight percent values and ranges therebetween.

Statement 4. A composition according to any one of the preceding claims, wherein the polymer component is chosen from polydopamines, alginates (e.g., sodium alginate and the like), chitosans, bovine serum albumin (BSA), and the like, and combinations thereof.

Statement 5. A composition according to any one of the preceding Statements, wherein the polymer component is present in the composition at 8-12 (e.g., 9-9.5) weight percent (based on the total weight of the composition), including all 0.1 weight percent values and ranges therebetween.

Statement 6. A composition according to any one of the preceding Statements, wherein the polymer component comprises (or is) bovine serum albumin (BSA) and, optionally, polydopamine.

Statement 7. A composition according to Statement 6, wherein the polydopamine is present in the composition at 1-1.5 weight percent (based on the total weight of the composition) and/or the BSA is present in the composition at 7.5-8 weight percent (based on the total weight of the composition).

Statement 8. A composition according to any one of the preceding claims, wherein the carrier is chosen, from water, buffers (e.g., dilute aqueous Tris buffer solution, and the like), organic solvents (e.g., polar aprotic solvents, such as, for example, DMF, NMP, alcohols, and the like), and combinations thereof. It may be desirable that organic solvent, if present, is miscible with water. In various examples, the carrier has a pH of 7.5-9 (e.g., about 8.5), including all 0.1 pH values and ranges therebetween. In various examples, the carrier(s) make up the remainder of the composition. In various examples, the carrier comprises (or is) Tris buffered solution.

Statement 9. A composition according to any one of the preceding Statements, wherein the composition exhibits non-Newtonian behavior and/or viscoelastic behavior. It is desirable that composition have viscoelastic behavior such that the composition can be 3D printing through direct extrusion process (e.g., the composition behaves as a paste that can be continuously drawn out but at the same time maintains one or more of its rheological properties and/or at least a portion of or all of the structure, which may be a printed structure, formed on the surface on which it is being printed.

Statement 10. A method of making a composition of any one of Statements 1-9, comprising: contacting a graphene component; a polymer component (which may be a first polymer and a second polymer); and a carrier. In various examples, the graphene component and/or polymer component and/or carrier are those described in the preceding claims and individual present in the amounts described in the preceding claims. The method may further comprise mixing the components and carrier. In various examples, the mixing is carried out by sonication. One or more of the polymer(s) of the polymer component (e.g., the first and/or the second polymer) may, independently, be preformed or formed in situ. At least a portion of or all of one or more of the polymer(s) of the polymer component may interact (e.g., via aryl-aryl interaction, or the like) and/or be chemically bonded (e.g., covalently, non-covalently, or the like, or a combination thereof) to at least a portion of the graphene component. A method may produce a composition comprising metal nanoparticles and/or metal oxide nanoparticles. In various examples, preformed/presynthesized metal and/or metal oxide nanoparticles are contacted with the graphene component; the polymer component (which may be a first polymer and a second polymer); and the carrier. In various other examples, the graphene components are preformed/presynthesized graphene-metal or graphene-metal oxide nanocomposites. In various other examples, one or more precursors for metal or metal oxide nanoparticles are contacted with the graphene component; the polymer component (which may be a first polymer and a second polymer); and the carrier and the methods further comprise conversion (e.g., thermal conversion, which may be carried out in new distinct heating step or result from an existing during the carrier removal (e.g., freeze-drying) or annealing processes) of the precursor(s) to metal or metal oxide nanoparticles. In various other examples, the nanoparticles are added to the composition in a post composition formation (e.g., after gel or hydrogel formation, after aerogel formation, etc.), such as, for example, dip-coating the composition (e.g., hydrogel, aerogel, etc.) in a solution of metal or metal oxide precursor(s) and then converting the precursor(s) (e.g., reducing the precursor(s)) to metal and metal oxide nanoparticles.

Statement 11. A method according to Statement 10, wherein a graphene component or a portion thereof is contacted with a first polymer (or a monomer that can be polymerized to form the first polymer prior to contacting the graphene component) and then with a second polymer. In the case where the graphene component or a portion thereof is contacted with one or more monomer(s) that can be polymerized to form the first polymer, the contacting may be carried out under conditions wherein the graphene component and first polymer is formed. In various examples, graphene oxide is contacted with dopamine under conditions wherein polydopamine is formed. A non-limiting example of a monomer is dopamine hydrochloride. At least a portion or all of the polymer chains of the first polymer may be disposed (e.g., chemically bonded, such as, for example, ionically or covalently bonded) on a surface of at least a portion of or all of the graphene component.

Statement 12. A method according to Statements 10 or 11, wherein the contacted (e.g., mixed) components and carrier are held at room temperature (e.g., 18-24° C.) or a temperature of 18-100° C., including all integer ° C. values and ranges therebetween, for a selected period of time (e.g., up to about 24 hours). At this stage, the composition may be a gel composition.

Statement 13. A method according to any one of Statements 10-12, wherein the contacted (e.g., mixed) components and carrier are heated (e.g., at a temperature of 70-90° C. (e.g., about 85° C.) and/or for a selected period of time (e.g., 0.5-3 hours or about 1 hour). At this stage, the composition may be a gel or hydrogel composition. Without intending to be bound by any particular theory, it is considered that the heating results in crosslinking of at least a portion of or all of the polymer component or crosslinking at least a portion of or all of one or more of the polymer(s) of the polymer component to form a gel or hydrogel.

Statement 14. A three-dimensional (3D) object comprising a graphene component; a polymer component (which may be a first polymer and a second polymer). In various examples, the graphene component and/or polymer component and/or carrier are those described in the preceding claims and individually present in the amounts described in the preceding claims. In various examples, the object is formed from one or more composition(s) of any one of Statements 1-9 and/or one or more composition(s) of any one of Statements 10-13 and/or the object is formed using a method according to Statements 20 or 21. In various examples, the three-dimensional object is a monolith, or the like. The three-dimensional object may be free-standing.

Statement 15. A three-dimensional object according to Statement 14, wherein the three-dimensional object defines a plurality of voids. In various examples, the voids are internal/encapsulated, have at least one external opening, or a combination thereof. At least a portion of or all of the voids may be interconnected. The voids may be referred to as pores. A three-dimensional object may be macroporous. A three-dimensional object may have s the more interconnected macropores, at least a portion or all of which may be interconnected and/or may have a size (e.g., one or more dimension) of 50-500 microns, including all 0.1 micron values and ranges therebetween, and/or pores disposed between individual graphene components (and may or may not be interconnected), which may have a size range (e.g., one or more dimension of) of 500 nannometers to 5 microns, including all integer nanometer values and ranges therebetween. Without intending to be bound by any particular theory, it is considered that the voids (or a portion of the voids) are produced by removal or all or substantially all of the carrier (e.g., water) (e.g., by a freeze drying process) and/or interaction between the graphene component and polymer(s).

Statement 16. A three-dimensional object according to Statements 14 or 15, wherein at least a portion of or all of the three-dimensional object is an aerogel.

Statement 17. A three-dimensional object according to any one of Statements 14-16, wherein the three-dimensional object has a porosity volume fraction of 85% or great or 90% or greater (e.g., 89-91%).

Statement 18. A three-dimensional object according to any one of Statements 14-17, wherein the three-dimensional object further comprises a carrier. In various examples, the carrier is one or more of those described in the preceding claims.

Statement 19. A three-dimensional object according to any one of Statements 14-18, wherein the three-dimensional object is formed by additive or advanced manufacturing (e.g., direct ink writing (DIW) printing, 3D printing, robocasting, extrusion-based fabrication, and the like).

Statement 20. A method of making a three-dimensional object (e.g., an additive or advanced manufacturing method, such as, for example, a direct ink writing (DIW) printing method, 3D printing method, robocasting method, extrusion-based fabrication method, or the like) comprising: using a formed from one or more composition(s) of any one of Statements 1-9 and/or one or more composition(s) of any one of Statements 10-13 in an additive or advanced manufacturing, 3D printing, robocasting, extrusion-based fabrication method to form a three-dimensional object (e.g., a three-dimensional object of any one of Statements 14-19).

Statement 21. A method according to Statement 20, further comprising removing at least a portion of, substantially all of, or all of the carrier from the three-dimensional object. In various examples, at least a portion of, substantially all of, or all of the carrier is removed from the three-dimensional object using freeze-drying, supercritical extraction, vacuum drying (which may be carried out with heating), or the like.

Statement 22. A method of removing at least a portion of one or more contaminant(s) or all the contaminant(s) from a sample comprising one or more contaminant(s) comprising: contacting the sample with one or more three-dimensional object(s) of any one of Statements 14-16 or made by a method according to Statement 21, wherein one or more or all the contaminant(s) is adsorbed by the three-dimensional object(s). In various examples, the method is carried out in a batch reactor mode or in a continuous mode. In various examples, the contacting is carried out two or more times (e.g., with the same three-dimensional object(s) or at least two different three-dimensional object(s). In the case where compositions comprising one or more metal and/or metal oxide nanoparticle(s) are used, without intending to be bound by any particular theory, it is considered that the metal and/or metal oxide nanoparticle(s) at least partially degrade or complete degrade, or eliminate (e.g., act as catalyst(s) (e.g., photocatalyst(s), redox-active agents, and the like) one or more of the contaminant(s).

Statement 23. A method according to Statement 22, wherein the one or more contaminant(s) are chosen from dyes, metals (which may be heavy metals), organic solvents, oil/petroleum products, organic contaminants, and the like, and combinations thereof. Non-limiting examples of dyes include methylene blue (MB), Evans blue (EB), and the like. Non-limiting examples of metals include Cr(IV), Pb(II), Cd(II), Cu(II), and the like. Non-limiting examples of organic solvents include alkanes (such as, for example, n-hexane, toluene, benzene, chloroform, and the like. Non-limiting examples of oil/petroleum products include kerosene, diesel, and the like. Non-limiting examples of organic contaminants include pharmaceuticals and personal care products (PPCPs), per- and polyfluoroalkyl substances (PFAS), polychloro biphenyls(PCBs), and the like.

Statement 24. A method according to Statements 22 or 23, wherein the one or more or all the contaminant(s) is/are present in an aqueous sample or the like.

Statement 25. A method according to any one of Statements 22-24, wherein the sample is an aqueous sample is or is derived from a wastewater sample (e.g., a municipal wastewater or storm water sample, industrial wastewater sample, storm water runoff, and the like), surface water, an industrial water sample (e.g., water used to make a commercial product, such as, for example, a reagent, a solvent, or the like), a municipal drinking water sample, a body of water (e.g., a salt-water body of water, such as, for example, an ocean, a sea, and the like, a fresh-water body of water, such as, for example, a lake, a pond, river, stream, or the like) or the like.

Statement 26. A method according to any one of Statements 22-25, wherein the one or more three-dimensional object(s) and at least a portion of one or more contaminant(s) or all the contaminant(s) are separated from the aqueous sample, or the like. In various examples, the separation is a physical separation (e.g., adsorption, filtration, or the like).

Statement 27. A method according to Statement 26, wherein the one or more three-dimensional object(s) are regenerated (e.g., the one or more contaminant(s) is/are removed from the one or more three-dimensional object(s), for example, by heating or desorbing in an regenerating solvent, such as, for example, an organic solvent (e.g., ethanol).

Statement 28. A method according to any one of Statements 22-27, wherein 50% or more, 60% or more, 70% or more, 80% or more, 90% or more, 95% or more, 99% or more, or 100% of the one or more contaminant(s) is/are removed from the sample. The amount of the one or more or all contaminant(s) can be quantified in the sample (before and/or after the contacting) by methods known in the art. In various examples, the amount of the one or more contaminant(s) or all of the contaminants are quantified in the sample (before or after the contacting) by one or more methods chosen from spectroscopic methods (such as, for example, UV-Visible spectroscopy, inductively coupled plasma—optical emission spectroscopy, high performance liquid chromatography, gas chromatography, fluorescence spectroscopy, liquid chromatography mass spectrometry, and the like), spectrometry methods, colorimetric methods, and the like, and combinations thereof.

Statement 29. A printable gel composition comprising: a graphene component; polydopamine; a carrier; and optionally, one or more additional polymers chosen from alignates, chitosans, bovine serum albumin (BSA), and combinations thereof, where the polydopamine is non-covalently and/or covalently bound to the graphene component.

Statement 30. A printable gel composition according to Statement 29, where the printable gel composition has a minimum viscosity of 10,000, 20,000, 30,000, 40,000, 50,000, 100,000, 200,000, 300,000, 400,000, 500,000, 600,000, 700,000, 800,000, 900,000, or 1,000,000 mPa·s.

Statement 31. A printable gel composition according to Statements 29 or 30, where the total polymer concentration of the polydopamine and, optionally, the one or more additional polymers is 8-12 weight percent (based on the total weight of the composition), including every 0.1 weight percent value and range therebetween.

Statement 32. A printable gel composition according to any one of Statements 29-31, where there is one or more additional polymers and the additional polymer is BSA.

Statement 33. A printable gel composition according to Statement 32, where the polydopamine is present at a concentration of 1-1.5 weight percent (based on the total weight of the composition), including every 0.01 weight percent value and range therebetween, and the BSA is present in the composition at a concentration of 7.5-8 weight percent (based on the total weight of the composition), including every 0.01 weight percent value and range therebetween.

Statement 34. A printable gel composition according to any one of Statements 29-33, further comprising a plurality of metal nanoparticles, metal oxide nanoparticles, or the like, or a combination thereof.

Statement 35. A printable gel composition according to Statement 34, where at least a portion of the metal nanoparticles and/or metal oxide nanoparticles are disposed on at least a portion of a surface or a plurality of surfaces of the graphene component.

Statement 36. A printable gel composition according to Statements 34 or 35, where the metal nanoparticles and/or metal oxide nanoparticles are redox active nanoparticles, photocatalysts, Noble metal catalysts, transition metals, rare earth metals, or the like, or multimetallic nanoparticles.

Statement 37. A printable gel composition according to Statement 36, where the redox active nanoparticles are chosen from iron nanoparticles, magnetite nanoparticles, hematite nanoparticles, and the like, and combinations thereof, the photocatalysts are chosen from, titanium dioxide nanoparticles, zinc oxide nanoparticles, and the like, and combinations thereof, the Noble metal catalysts are chosen from silver nanoparticles, gold nanoparticles, platinum nanoparticles, and the like, combinations thereof, and the mulitimetallic nanoparticles are chosen from Fe/Ni nanoparticles, Au/Ni nanoparticles, Pt/Ni nanoparticles, Fe/Pd nanoparticles, Fe/Pt nanoparticles, Au/CeO$_2$ nanoparticles, Au/ZnO nanoparticles, Au/TiO$_2$ nanoparticles, Fe/TiO$_2$ nanoparticles, and the like, and combinations thereof.

Statement 38. A printable gel composition according to any one of Statements 34-37, where the metal nanoparticles and/or metal oxide nanoparticles are present at a concentration of 1-10 weight percent (based on the total weight of the composition), including every 0.1 weight percent value and range therebetween.

Statement 39. A printable gel composition according to any one of Statements 29-38, where the graphene component is chosen from single layer graphene, multilayer graphene, single layer graphene oxide, multilayer graphene oxide, single layer surface-modified graphene oxide, multilayer surface-modified graphene oxide, reduced graphene oxide (chemically or thermally reduced), partially reduced graphene oxide (chemically or thermally reduced), and the like, and combinations thereof.

Statement 40. A printable gel composition according to any one of Statements 29-39, where the graphene component is dispersed in the water.

Statement 41. A printable gel composition according to any one of Statements 29-40, where the graphene component is present at a concentration of 0.5-5 weight percent (based on the total weight of the composition), including every 0.01 weight percent value and range therebetween.

Statement 42. A printable gel composition according to any one of Statements 29-41, where printable gel composition is buffered.

Statement 43. A printable gel composition according to Statement 42, where the printable gel composition has a pH of 7.5-9, including every 0.01 pH value and range therebetween.

Statement 44. A printable gel composition according to any one of Statements 29-43, where the carrier is chosen from water, one or more organic solvent, and a combination thereof, where the solvent is chosen from polar aprotic solvents, polar protic solvents, and the like, and combinations thereof.

Statement 45. A printable gel composition according to Statement 44, where the polar aprotic solvents are chosen from dimethylformamide (DMF), N-methyl-2-pyrrolidone (NMP), and the like, and combinations thereof and the polar protic solvents are chosen from alcohols, ionic liquids, deep eutectic solvents, and the like, and combinations thereof.

Statement 46. A three-dimensional (3D) object comprising: a graphene component; polydopamine; and optionally, one or more additional polymers chosen from alginates, chitosans, bovine serum albumin (BSA), and the like, and combinations thereof.

Statement 47. A three-dimensional (3D) object according to Statement 46, where the three-dimensional (3D) object is free-standing.

Statement 48. A three-dimensional (3D) object according to Statements 46 or 47, where the three-dimensional (3D) object is a monolith.

Statement 49. A three-dimensional (3D) object according to any one of Statements 46-48, where the three-dimensional (3D) object defines a plurality of voids.

Statement 50. A three-dimensional (3D) object according to any one of Statements 46-49, where the voids are internal/encapsulated.

Statement 51. A three-dimensional (3D) object according to any one of Statements 46-50, where the three-dimensional (3D) object defines at least one external aperture.

Statement 52. A three-dimensional (3D) object according to any one of Statements 49-51, where at least a portion of the voids are interconnected.

Statement 53. A three-dimensional (3D) object according to any one of Statements 46-52, where the three-dimensional (3D) object is macroporous.

Statement 54. A three-dimensional (3D) object according to Statement 53, where the three-dimensional object has a porosity volume fraction of 85% or greater, 86% or greater, 87% or greater, 88% or greater, 89% or greater, 90% or greater, 91% or greater, 92% or greater, 93% or greater, 94% or greater, or 95% or greater.

Statement 55. A three-dimensional (3D) object according to any one of Statements 46-54, where at least a portion of the three-dimensional object (3D) is an aerogel.

Statement 56. A three-dimensional (3D) object according to any one of Statements 46-55, where the three-dimensional object is formed by additive or advanced manufacturing (e.g., 3D printing).

Statement 57. A method of removing at least a portion of one or more contaminant(s) from a sample comprising one or more contaminant(s) comprising: contacting the sample with one or more three-dimensional object(s) according to any one of Statements 46-56, where one or more or all the contaminant(s) is adsorbed by the three-dimensional object(s).

Statement 58. A method according to Statement 57, where the contacting step is performed two or more times.

Statement 59. A method according to Statements 57 or 58, where the one or more contaminant(s) are chosen from dyes, metals, organic solvents, oil/petroleum products, organic contaminants, and the like, and combinations thereof.

Statement 60. A method according to any one of Statements 57-59, where the one or more contaminant(s) is/are present in an aqueous sample.

Statement 61. A method according to Statement 60, where the sample is an aqueous sample is or is derived from a wastewater sample, surface water, an industrial water sample, a municipal drinking water sample, or a body of water.

Statement 62. A method according to any one of Statements 57-61, further comprising regenerating the one or more three-dimensional object(s).

Statement 63. A method according to any one of Statements 57-62, where 50% or more the one or more contaminant(s) is/are removed from the sample.

The following example is presented to illustrate the present disclosure. The example is not intended to be limiting in any matter.

EXAMPLE

The following discussion provides exemplary gels and hydrogels of the present disclosure, methods of making same, articles made from same, and methods of preparing the articles. These examples are intended to illustrate some embodiments of the disclosure and are not intended to be limiting in any way.

Described herein is a direct ink writing (DIW) 3D printing technique and subsequent freeze-drying to prepare graphene-biopolymer aerogels for water treatment. To render appropriate rheology for DIW printability, two bio-inspired polymers, polydopamine (PDA) and bovine serum albumin (BSA), were added to the graphene-based ink. The biopolymers also contributed to the contaminant removal capacity of the resultant graphene-polydopamine-bovine serum albumin (G-PDA-BSA) aerogel. The physicochemical properties of the aerogel were thoroughly characterized from nano- to macroscale. The 3D printed aerogel exhibited desirable water contaminant removal performance for heavy metals (Cr(VI), Pb(II)), organic dyes (cationic methylene blue and anionic Evans blue), and organic solvents (n-hexane, n-heptane, and toluene) in batch adsorption studies. The electrostatic interaction dominated the removal of heavy metals and dyes while the hydrophobic interaction dominated the removal of organic solvents from the water. Moreover, the aerogel showed desirable regeneration and reuse potential. The aerogel removed 100% organic solvents over 10 cycles of regeneration and reuse; additionally, the removal efficiencies for methylene blue decreased by 2-20% after the third cycle. The fit-for-design 3D printed aerogel was also effectively used as a bottle-cap flow-through filter for dye removal. The potential and vision of the 3D printing approach for graphene-based water treatment presented here can be extended to other functional nanomaterials, can enable shape-specific applications of fit-for-purpose adsorbents/reactors and point-of-use filters, and can materialize the large-scale manufacturing of nano-enabled water treatment devices and technologies.

It was sought herein to alleviate the challenges of 3D printability and water stability of graphene-based aerogels and to demonstrate a process for DIW 3D printing of a graphene-biopolymer aerogel that can be used in water treatment applications. It was hypothesized that graphene surface modification using selected biopolymeric additives can enable 3D printability, water stability, and contaminant removal ability of graphene-based aerogels. For this, two bio-inspired polymers, polydopamine (PDA) and bovine serum albumin (BSA), were selected as viscosifying additives for achieving the appropriate viscoelastic rheology for DIW 3D printing of graphene aerogels. Furthermore, these polymers are well known for modifying GO surfaces for adsorption of diverse contaminants e.g., heavy metals, dyes, and organic contaminants. A viscoelasticity-optimized ink was synthesized from graphene-polydopamine-bovine serum albumin (G-PDA-BSA) dispersion, 3D printed a self-standing cylindrical structure with submillimeter precision, and subsequently freeze-dried to obtain the G-PDA-BSA aerogel. The hierarchical porous structure and physicochemical properties of 3D printed aerogels were characterized using nanoscale X-ray computed tomography (nano-CT), Brunauer-Emmett-Teller (BET) surface area, pycnometer, scanning and high-resolution transmission electron microscopy (SEM and HRTEM), electron dispersive X-ray spectroscopy (EDS), X-ray diffraction (XRD), Raman, and Fourier transformed infrared (FTIR) spectroscopy, thermogravimetric analyses (TGA), and zeta potential measurement. The G-PDA-BSA aerogels were tested for the batch adsorption of a wide-range of water contaminants to show the potential application of these 3D printed aerogels as nano-adsorbents for water treatment. These contaminants included cationic and anionic dyes i.e., methylene blue (MB) and evans blue (EB), respectively, heavy metals i.e., chromium (Cr (VI)) and lead (Pb (II), and organic solvent i.e., n-heaxane, n-heptane, and toluene. Finally, the applicability of 3D printed fit-for-design G-PDA-BSA aerogel for water filtration was tested for MB removal using a 3D printed bottle-cap flow-through filtration system.

Materials and Method

Materials

Single-layer graphene oxide (GO) (>99.3 wt %, thickness 0.43-1.23 nm) (US Research Nanomaterials, Inc., Houston, TX), dopamine hydrochloride (Sigma-Aldrich, St. Louis, MO), and lyophilized bovine serum albumin (BSA, Fisher Scientific, Fair Lawn, NJ) were used as purchased. TRIS (tris(hydroxymethyl aminomethane)) buffered saline, lead nitrate ($PbNO_3$, ≥99%), and Evans blue (EB or $C_{34}H_{24}N_6Na_4O_{14}S_4$) were purchased from Sigma-Aldrich (St. Louis, MO). Methylene blue (MB or $C_{16}H_{18}ClN_3S$, Fisher Scientific, Fair Lawn, NJ), potassium dichromate ($K_2Cr_2O_7$, 99.99%, Mallinckrodt Baker, Inc., Phillipsburg, NJ), n-hexane ($C_6H_{14}$, ≥99%, Acros Organics, Geel, Belgium), n-heptane ($C_7H_{16}$, ≥99%, Acros Organics, Geel, Belgium) and toluene ($C_7H_8$, 99%, Fisher Scientific, Fair Lawn, NJ) were also used as purchased.

G-PDA-BSA Ink Preparation and Characterization

GO nanosheets at a concentration of 30 mg/mL were dispersed in 20 mM Tris buffered solution by sonicating for 2 hours (8 s pulse on followed by 2 s pulse off, amplitude 50, input power 15-18 watt) with a microtip (1/16") based ultrasonic dismembrator (Q 700, Qsonica Sonicators, Newtown, CT). Then, dry dopamine hydrochloride powder (15 mg/mL) was added to the dispersion and sonicated for 10 minutes at the same pulse on-off period and sonication power. The pH of the dispersion was adjusted to 8.5 with ammonium hydroxide ($NH_4OH$). The dispersion was then heated at 60° C. for 6 hours under magnetic stirring at 300 rpm on a hot plate stirrer for self-polymerization of polydopamine (PDA) to occur, which resulted in G-PDA dispersion. The dispersion was rested at room temperature for 24 hours. Then 1.5 mL of a 300 mg/mL aqueous dispersion of BSA was mixed with 5 mL of the above-prepared G-PDA dispersion using a bath sonicator (Branson, 2800, Danbury, CT). This G-PDA-BSA dispersion was thermally cured at 85° C. in an oven for 1 hour to induce the BSA mediated gelation, which formed a viscoelastic G-PDA-BSA ink. The apparent viscosities of the 3D printing ink during the fabrication process were measured with a rotational viscometer (NDJ-5S, M&A Instruments Inc., China) at different shear rates.

Method of 3D Printing and Freeze-Drying

Figure 13:
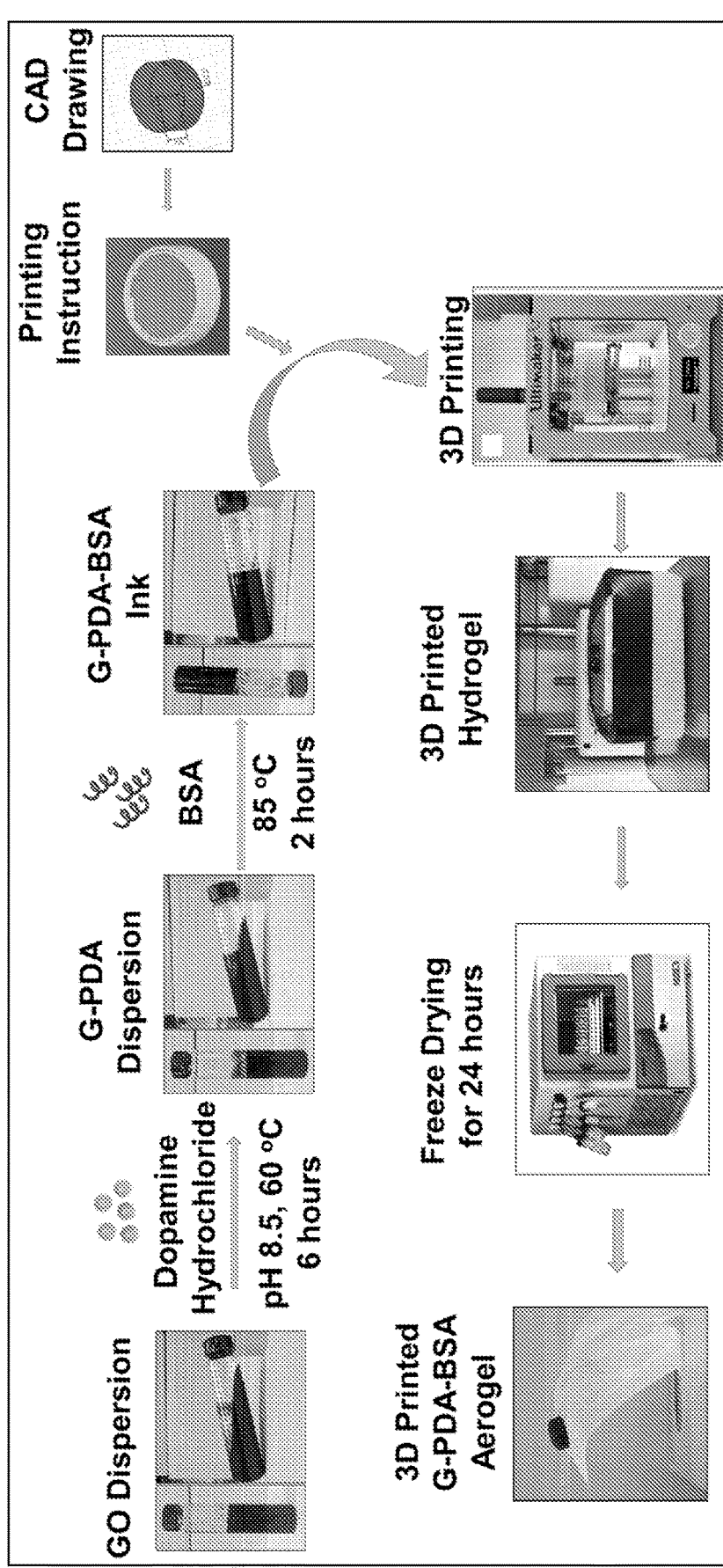
FIG. 13 shows a summary of the steps involved in the entire 3D printing process of G-PDA-BSA aerogel.
Figure 14:
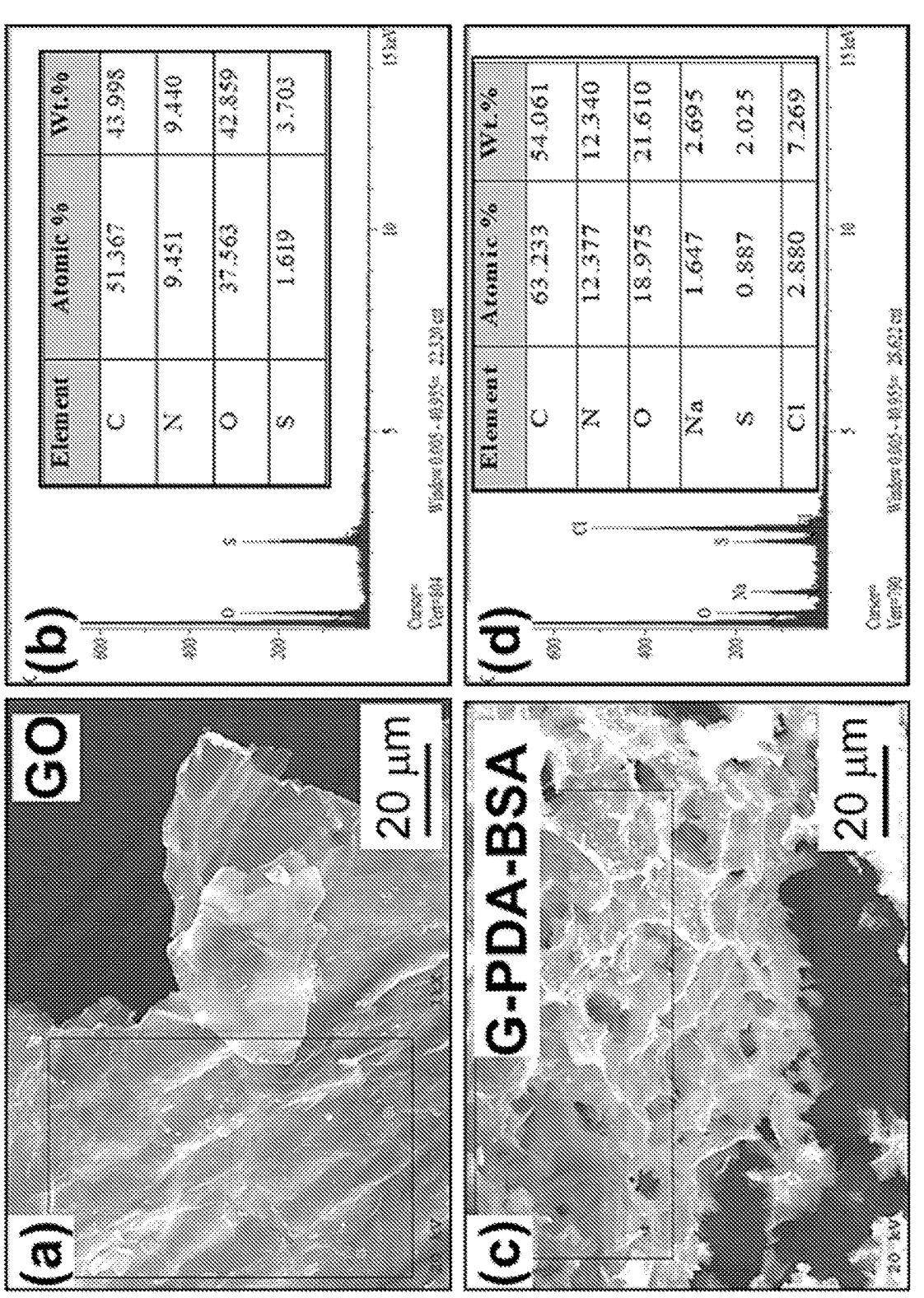
FIG. 14 shows SEM and EDS analysis of GO (a & b) and G-PDA-BSA aerogel (c & d).

FIG. 13 presents a flow-chart that shows different steps of the ink preparation and 3D printing process. A retrofitted Ultimaker 2 GO (brand name; not graphene oxide) Fused Deposition Modelling (FDM) 3D printer (Ultimaker B.V., MA) was used as the host framework for printing the aerogel. A 10 mL syringe barrel connected with a 600 μm diameter micro-nozzle was mounted on a holder that can move along XY direction following the designed toolpath generated by the printing software. The G-PDA-BSA ink was placed in the syringe barrel and was extruded through the nozzle by controlling the air pressure through a dispenser (Performus X100, Nordson Corporation, East Providence, RI). The base with a removable metallic substrate plate moved down one layer at a time in the Z direction after each layer of printing was completed. A CAD model of a cylindrical structure with a diameter 12 mm and height of 4 mm was converted into printing instructions by a computer program (Slic3r). The 3D printer followed the programmed instructions to print a cylindrical structure with G-PDA-BSA ink, replicable to the CAD model. The printing was executed using a printing speed of 20 mm/s and an individual layer height of 500 μm. The printed cylindrical G-PDA-BSA gel was transferred to a freezer (temperature −18° C.) for initiating the ice crystallization. The frozen gel was then freeze-dried (Labconco FreeZone Triad, Kansas City, MO) for 24 hours to get the final G-PDA-BSA aerogel. These aerogels were kept at 85° C. for 2 hours in oven for removing any excess water.

Characterization of 3D Printed Aerogels

The macroporous structure of the 3D printed G-PDA-BSA aerogel was characterized with nano-scale X-ray computed tomography (Nano-CT, Zeiss Versa 520, White Plains, NY) in the Biotechnology Resource Center Imaging Facility (BRC) at Cornell University. The X-ray source was conducted with an accelerating voltage of 60 KV. A 20× objective was used at a final resolution of 380 nm per pixel. For preventing any disturbance to the aerogel structure, the whole sample was mounted inside the instrument. Total 1930 unbinned fluoroscopy images were captured with an exposure time of 10 seconds per image. The reconstructed 3D images were cropped to volume of 1845×1845×700 voxels (700×700×266 μm). Further data processing for manual thresholding and volume rendering was performed with Avizo™ (ThermoFisher Scientific™) software. The skeletal volume and density of the aerogel were calculated with a pycnometer (Micromeritics Accu-Pyc II 1340, Norcross, GA) using pressurized helium gas. The porosity (Π) of the aerogel was calculated from this skeletal density and bulk density measured from physical dimensions of the aerogels obtained with a Vernier caliper.

The micro- and nano-structural architecture and morphology of the G-PDA-BSA aerogels and GO nanosheets were analyzed using focused ion beam scanning electron microscope (FIB-SEM, Carl Zeiss AURIGA, White Plains, NY) and high-resolution transmission electron microscopy (HRTEM, JEOL JEM 2010, JEOL USA, Inc., Peabody, MA). For SEM characterization of the aerogel, a thin section of the aerogel was cut from the middle of the monolith using a sharp razor and was placed on a stub using double-sided adhesive carbon tape. A SPI-Module™ (West Chester, PA) was used to deposit a thin layer of gold to make the sample conductive for SEM imaging. The HRTEM was carried out with an accelerating voltage of 200 KV. HRTEM samples were prepared by ultrasonicating 1 mg of the aerogel in 10 mL ethanol for 10 min. Then, 1 mL of this suspension was placed on a carbon-coated copper grid (100 mesh, Ted Pella, Inc.) and dried before analysis. The elemental composition of samples was analyzed with field emission scanning electron microscope (Hitachi SU70, Japan) coupled with an Oxford energy dispersive spectrometer (EDS, Oxford Instruments, Concord, MA). A Micromeritics Tri-Star II instrument (Micromeritics, Norcross, GA) was used to obtain $N_2$ adsorption-desorption isotherms the GO nanosheets and G-PDA-BSA aerogels. The isotherm data were used to calculate the specific surface area and pore size distribution (PSD) based on the Brunauer-Emmett-Teller (BET) theory and non-local density functional theory (NLDFT) slit pore model, respectively.

The crystallographic fingerprint of the aerogels was identified with X-ray diffraction (XRD, Rigaku Ultima IV, Rigaku Corporation, Wilmington, MA) using a scan rate of 2°/min and step size of 0.02°. Information on molecular vibration and defects in crystallographic structures of the samples were analyzed using Raman spectroscopy (Renishaw InVia, Renishaw plc., West Dundee, IL) with an incident excitation wavelength of 514 nm. Fourier-transform infrared (FTIR) spectroscopy (1760 FTIR, Perkin-Elmer, Waltham, MA) was done to analyze the composition and covalent bonding of functional groups present in the sample. Thermal response and stability of the samples in the air was characterized using thermogravimetric analysis (TGA, Micromeritics Instrument Corp., Norcross, GA) with a ramp rate of 10° C./min up to 1000° C. Surface charge of the aerogels was determined from measuring the zeta potential of aerogel powders in aqueous media using a Malvern Zetasizer Nano-ZS particle analyzer (Westborough, MA).

Water Contaminant Removal by 3D Printed Aerogels

Batch adsorption experiments were performed with the 3D printed G-PDA-BSA aerogels to determine their water contaminant removal capacity for Cr (VI), Pb (II), MB, and EB at room temperature. In a typical experiment setup, cylindrical G-PDA-BSA aerogels, each with a mass of ~40 mg, were placed individually in separate glass vials containing 15 mL aqueous solution of individual contaminants at different initial concentrations. The vials were kept shaking in a rotary shaker for 96 hours at 150 rpm to reach adsorption equilibrium. In order to test the release of BSA from the aerogel, a similar experiment was carried out in DI water. After adsorption, the intact and free-standing aerogels were removed from the water and the final concentration of the contaminant was recorded. Cr (VI) concentrations were measured by spectrophotometric analysis using a 96-well plate with UV-vis spectrometry (SpectraMax® i3, San Jose, CA) using chelating agent 1,5-diphenylcarbazide by comparing the optical response with a calibration curve. Pb (II) concentrations were measured by inductively coupled plasma optical emission spectrometer (ICP-OES) (iCAP 6000, Thermo Scientific, Grand Island, NY). For determining MB, EB, and BSA concentration, UV-vis spectrometric analysis (Cary 60, Agilent Technologies, Santa Clara, CA) was performed using 3 mL cuvette at wavelength 665, 620, and 280 nm respectively.

For testing the removal of organic solvents n-hexane, n-heptane or toluene using the 3D printed aerogel, 300 μL solvent layer was placed over 3 mL of water in a measuring cylinder. The aerogels were placed on top of the solvent layer to remove the solvent from the solvent-water interphase. n-Hexane, n-heptane, and toluene removal capacity was calculated by measuring the weight of the aerogel before and after the removal experiments.

Regeneration and Reuse of 3D Printed Aerogels

The regeneration and reuse of 3D printed G-PDA-BSA aerogels was tested for the removal of dye MB and organic solvents. In the case of MB, the free-standing aerogel, after reaching the adsorption equilibrium, was taken out of the vial and shaken in 15 mL ethanol (pH 2) in another glass vial at 150 rpm for 24 hours to allow desorption. After desorption, the aerogel was taken out and placed again in a vial with MB solution of desired concentration. This recycling process was repeated for three times. For organic solvents, after solvent adsorption, the aerogels were taken out and heated for 20 minutes at 70° C. for n-hexane, 100° C. for n-heptane, and 115° C. for toluene to allow the evaporation of adsorbed solvents. Once the adsorbed solvents evaporated, the aerogels were again used for solvent removal as mentioned earlier. This regeneration and reuse cycles for the aerogels with organic solvents were repeated for 10 times.

Flow-Through Filtration Study with 3D Printed Aerogel

A flow-through filtration study was performed with the 3D printed G-PDA-BSA aerogel using a bottle-cap filtration system. A perforated bottle-cap filter was designed with Fusion 360 (Autodesk Inc.) software and 3D printed with a FDM 3D printer with polylactic acid (PLA) filament. This filter system was designed to hold and fit the 3D printed G-PDA-BSA aerogel adsorbent for contaminated water to pass through it. The G-PDA-BSA aerogel was 3D printed with cylindrical dimensions of 14 mm diameter and 14 mm height to fit into the bottle-cap filter system. An aqueous solution of 1 ppm MB was passed through the filtration system with a hydrostatic pressure of 736 Pa under gravity. The MB concentration of the effluent was measured at different intervals to evaluate the MB removal performance of the filtration system.

Results and Discussion

Viscoelasticity and Printability of G-PDA-BSA Ink

For preparing a graphene-based ink that is usable in a DIW 3D printing process, two biopolymers PDA and BSA were incorporated. FIG. 1a shows the steps of the G-PDA-BSA ink synthesis process. The Tris buffer solution is known to enhance the dispersibility of GO by converting epoxy groups on the basal planes of GO into hydroxyl groups through ring opening reaction.

The addition of dopamine hydrochloride in the GO dispersion in Tris buffer at alkaline pH (pH=8.5) enables the self-polymerization of PDA and subsequent PDA coating of the graphene surface. Hydrogen bonding and π-π interaction between these GO nanosheets, and affinity between PDA and graphene aromatic rings caused overlapping and coalescence of G-PDA layers. This resulted in 1 order of magnitude increase in the apparent viscosity of G-PDA ink from GO ink, as shown in FIG. 1b. However, the G-PDA dispersion didn't attain the required viscoelasticity for DIW printability, as the G-PDA dispersion started flowing within the container when titled because of gravity (FIG. 1a).

After the addition of BSA to the G-PDA dispersion, the oxidized catechol groups of PDA interacted with the thiol and amine groups of BSA through Michael addition or Schiff base reactions, resulting in a G-PDA-BSA dispersion. When this G-PDA-BSA dispersion was heated (85° C.) beyond the transition temperature of BSA, heat-induced partial denaturation of BSA resulted in decrease in α-helix content and subsequent increase in β-sheet content. Hydrogen bonding between the ordered β-sheets along with electrostatic interaction triggered gelation entrapping the solvent within dispersion matrix. The resulting viscous G-PDA- BSA gel could hold its shape against the gravity, even when the container was placed upside down (FIG. 1a). The apparent viscosity of G-PDA-BSA gel (983000 mPa·s) was almost 2 and 3 order of magnitudes higher than that of G-PDA (220 mPa·s) and GO dispersion (32 mPa·s), respectively, at a shear rate of 1.27 s$^{-1}$ (FIG. 1b). Also, a gradual decrease in apparent viscosity (from 98300 to 9520 mPa·s) with the increase in shear rate (from ~1 to ~12 s$^{-1}$), indicated that the G-PDA-BSA gel achieved adequate shear thinning property and hence, its flowability under stress. Thus, the G-PDA-BSA gel attained the required viscoelasticity and shear thinning property of DIW printable ink. Notably, to obtain this 3D printable ink, the ratio of GO, PDA, and BSA was used as 1:0.5:3 which was experimentally determined to achieve the above-mentioned required viscosity and shear thinning property. The ratios for the trial and error experiments were selected based on the previous literature reported GO:PDA and GO:BSA ratios that performed graphene functionalization for water treatment.

Porous Structure and Physical Morphology of 3D Printed G-PDA-BSA Aerogels

Figure 2:
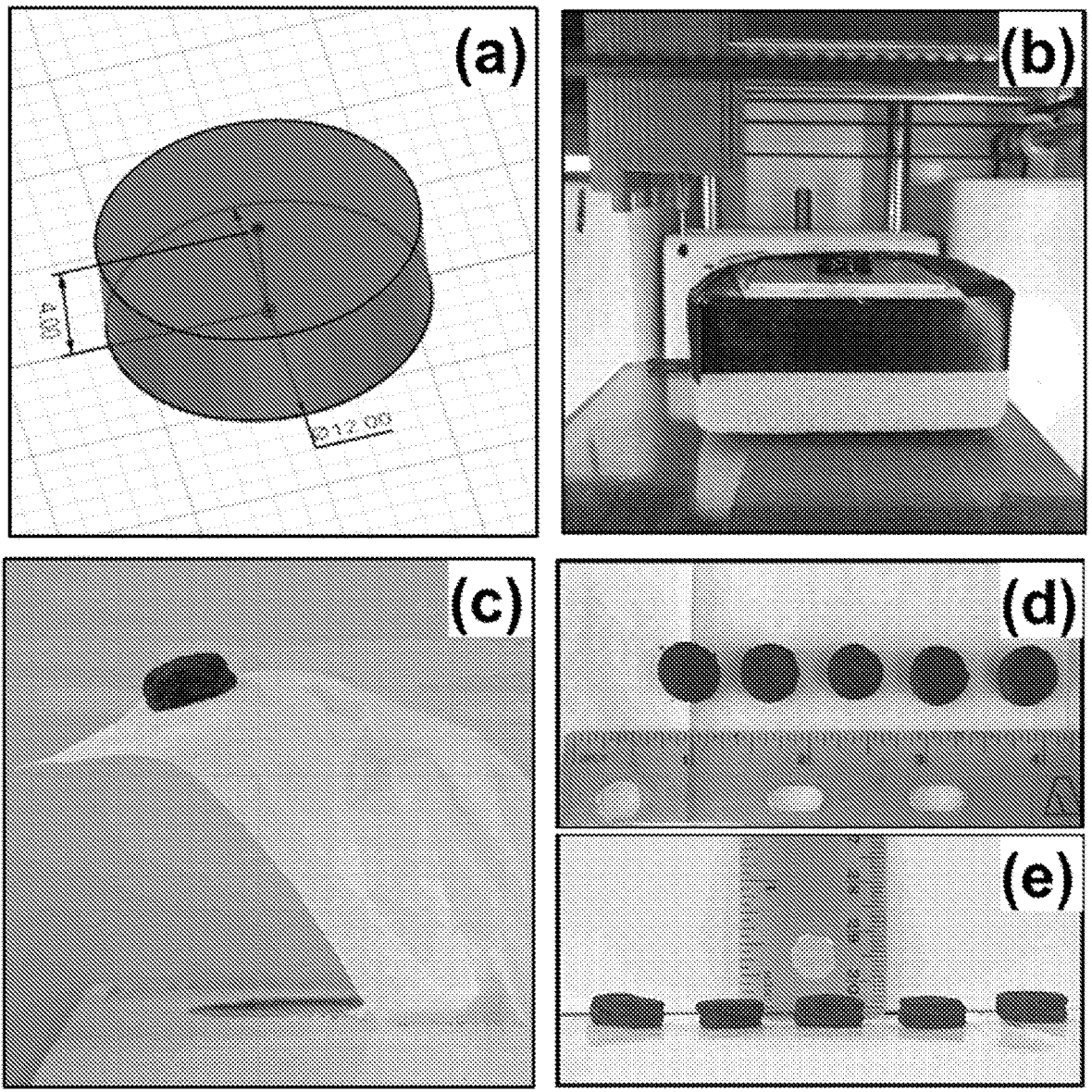
FIG. 2 shows a (a) Cylindrical 3D CAD model, (b) DIW printed G-PDA-BSA hydrogel, (c) freeze dried ultra-light G-PDA-BSA aerogel on top of a Kim wipe, (d, e) top and front view of printed aerogels.

The prepared G-PDA-BSA ink was directly printed as a free-standing structure based on a cylindrical CAD model that is shown in FIG. 2a. FIG. 2b shows the layer-by-layer DIW 3D printing process of G-PDA-BSA hydrogel on the metal base. The printed hydrogels were further freeze-dried to attain ultra-light and free-standing G-PDA-BSA aerogels as shown on the top of Kim wipe in FIG. 2c. The continuous and scalable 3D printing process produced replicable G-PDA-BSA aerogels as shown in FIG. 2d, 2e. Each of these aerogels had individual mass of ~40 mg with a density of ~88 mg/cm$^3$.

Nano X-ray computed tomography (Nano-CT) was carried out to study the 3D interconnected macro-porous network within the undisturbed and monolithic G-PDA-BSA aerogel. FIG. 3a shows as obtained high resolution (with voxel side length of 380 nm) 3D reconstruction of the 3D printed aerogel through volume rendering with Nano-CT data and presents the slightly contrasting graphitic matrix within the aerogel volume. FIG. 3b shows the lamellar and bonded G-PDA-BSA material network and also the void volumes confirming the connectivity among the macro-pores within the aerogel.

Figure 3:
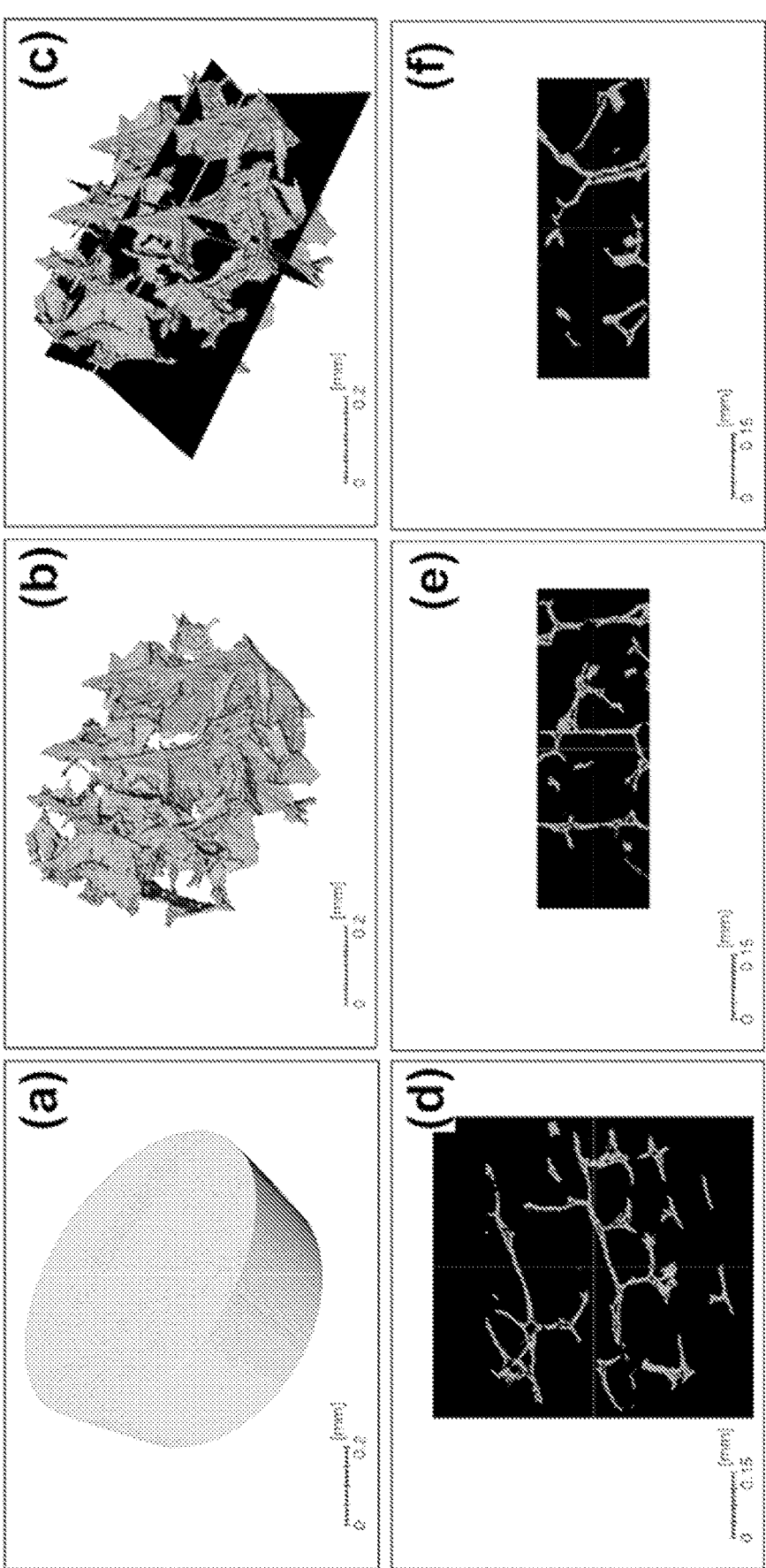
FIG. 3 shows 3D volume rendering of Nano-CT images (a) as-obtained, (b) noise filtered, (d, e, & f) representative cross-sectional Nano-CT image along the direction shown in (c).
Figure 4:
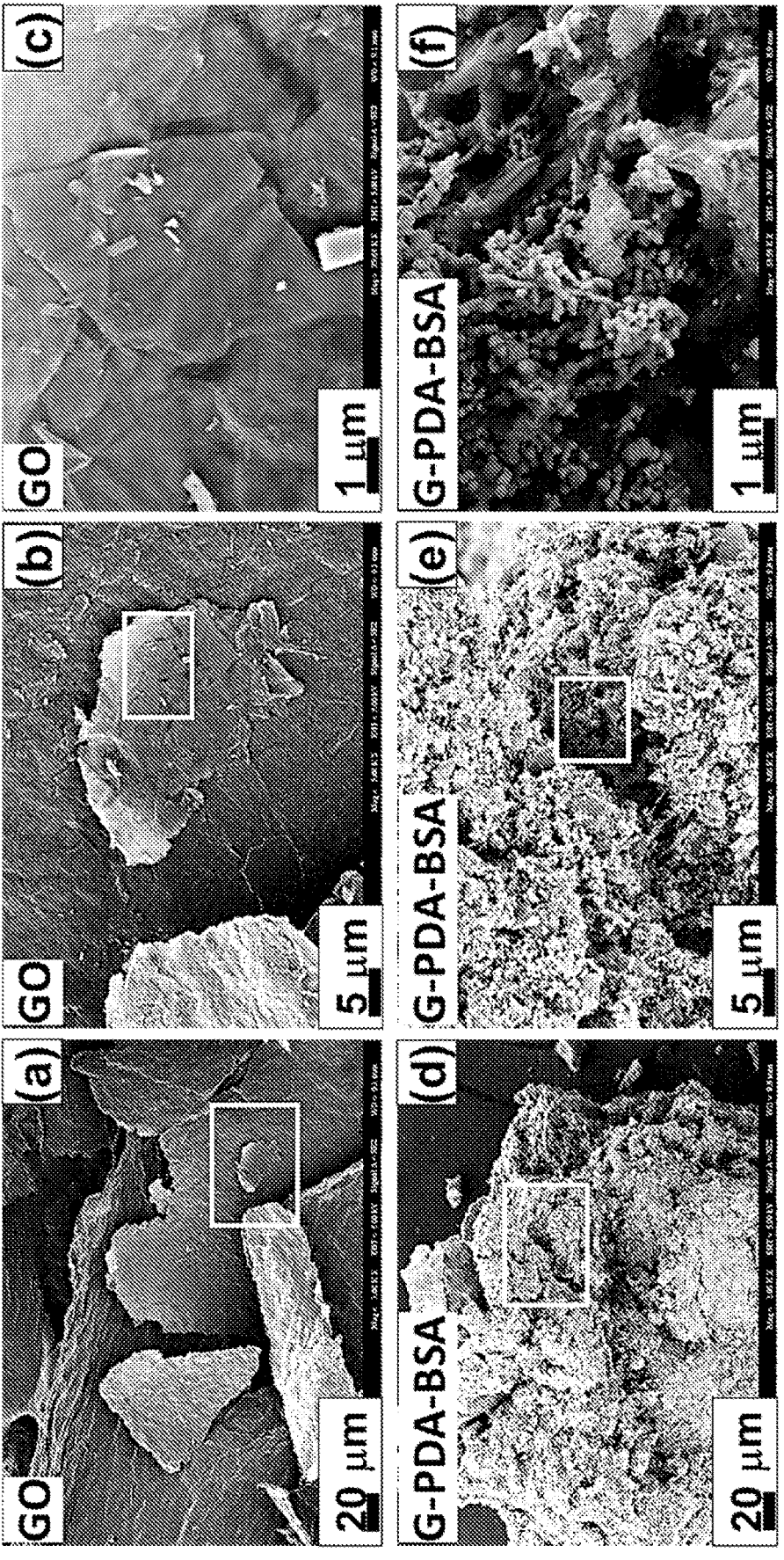
FIG. 4 shows SEM micrographs of (a, b, & c) GO and (d, e, & f) G-PDA-BSA aerogel at different magnifications. White rectangular boxes show the selected area which is magnified in the next (right) image.

The black rectangles in FIG. 3c represent the three axes along which images of 2D cross-sectional planes were obtained and shown in FIG. 3(d-f). These images also confirm the connectivity of porous networks by showing the macroscopic void volumes (black regions) separated by the thin and densely packed lamellar G-PDA-BSA matrix (lines). The freeze-drying process during the aerogel synthesis first transformed the water trapped within the G-PDA-BSA hydrogel to ice crystals. The volume expansion of the ice crystals creates pressures against the G-PDA-BSA graphene nanosheets to form the coalesced lamellar structures, and subsequent evaporation of the ice crystals create the interconnected macroscopic voids between these lamellar structures. The porous (void) volume fraction of the aerogel was calculated to be 89.1% from the voxel count of Nano-CT rendered volume, which was consistent with the value of 90.3% derived from helium gas displacement pycnometer. These interconnected porous channels can promote the passage of liquid (or contaminated water) facilitating the interaction of contaminants with adsorbent materials throughout the monolithic structure.

SEM imaging was performed to study the morphology within the macro-pore walls or lamellar material network of 3D printed aerogel, since nano-CT cannot provide information about the sub-micron porous structure. FIGS. 3(a-c) present the SEM images of the precursor GO while FIGS. 3(d-f) present the similarly magnified images of the G-PDA-BSA aerogels. SEM images suggest relatively smoother planar sheets for GO with numerous layers aggregated on top of each other, whereas, biopolymer functionalized graphene sheets (i.e., G-PDA-BSA) were twisted and coalesced with each other in case of G-PDA-BSA aerogel to impart a porous structure. Pores with a wide size range (sub-micron to ~10 μm) were identified within the lamellar material network, however, these pores were much smaller compared to the continuous macro-porous channels (shown by nano-CT in the previous section) within the monolithic aerogel structure. This confirms that the 3D printed aerogel had a hierarchical porous structure. The dense packing and bonding of the graphene nanosheets within the lamellar material network of the aerogel can impart excellent mechanical strength, which may have contributed to their excellent structural integrity during their application for contaminant removal from aqueous media.

Figure 15:
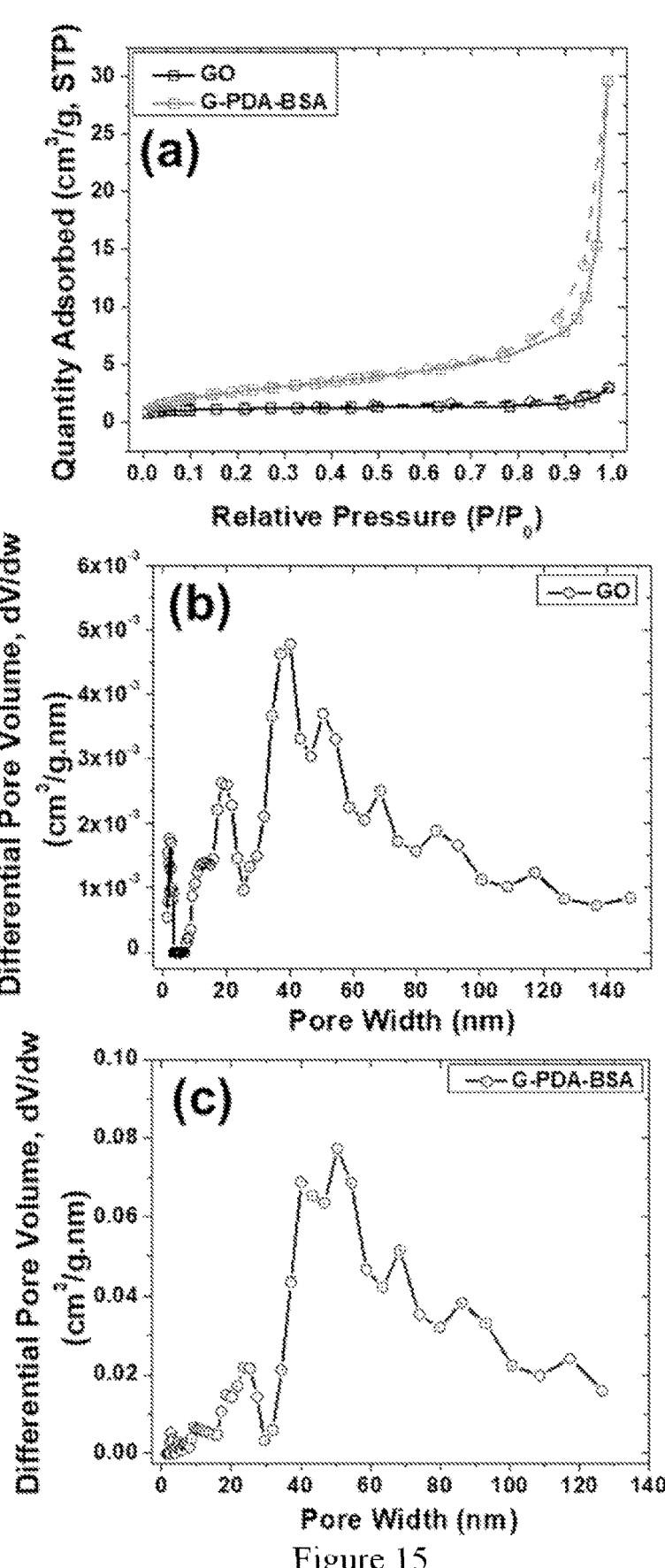
FIG. 15 shows (a) $N_2$ adsorption-desorption isotherm for GO and G-PDA-BSA. The solid line represents adsorption isotherm whereas the dotted line represents desorption isotherm and differential pore volume distribution as function of pore width for (b) GO and (c) G-PDA-BSA aerogel.

The BET surface area calculated from the N$_2$ adsorption isotherm for the G-PDA-BSA aerogel was 9.86 m$^2$/g, which was more than double than that of precursor GO (4.10 m$^2$/g) (FIG. 15a). These low surface areas can be attributed to aggregation in dried state, and also functionalization of graphene surfaces. The NLDFT pore size distribution indicates the presence of mesopores (<100 nm) in the G-PDA-BSA aerogel (FIG. 15c). The differential mesopore volume for G-PDA-BSA aerogel was 1 order of magnitude higher than that of precursor GO. These enhanced surface areas and mesopore volumes of the 3D printed aerogels can contribute significantly towards the pollutant removal.

Figure 5:
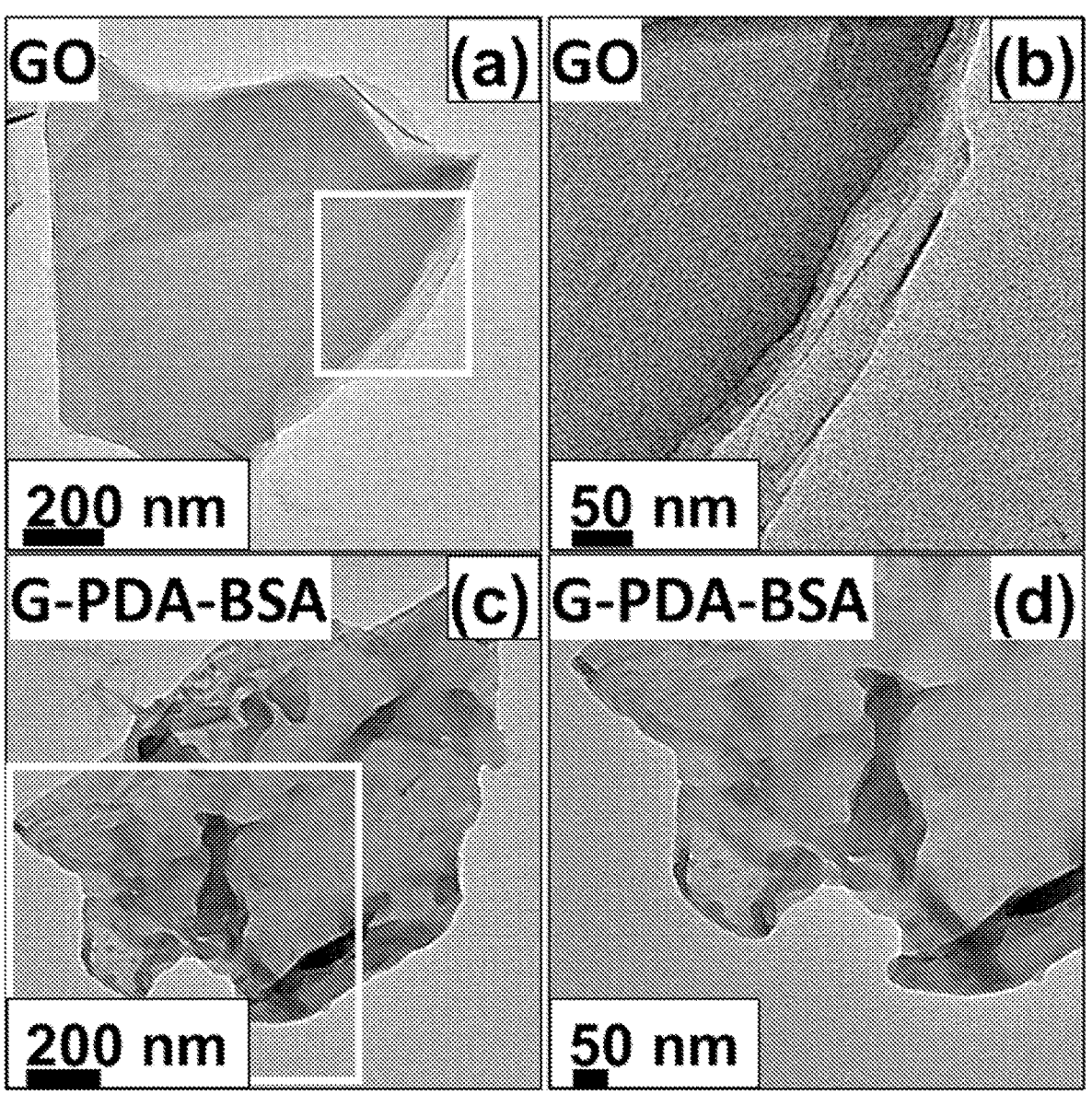
FIG. 5 shows TEM images of (a, b) GO nanosheets and (c, d) G-PDA-BSA aerogel at different magnifications. The right images are the magnified image of white rectangular box from previous left images.

To comprehend the morphology of aerogel material at nanoscale, TEM images of G-PDA-BSA aerogel were obtained and compared with that of GO. FIG. 5(a,b) present TEM images of GO showing their characteristic aggregated and few-layered 2D planar sheets. TEM images of G-PDA-BSA aerogels shown in FIG. 5(c,d) also show similar uniform 2D morphology, however, with wrinkled and folded regions of darker contrasts. Although PDA and BSA biopolymer layers are difficult to detect in TEM images, the alteration in transparency suggests successful coating of graphene sheets by PDA and BSA layers. Some protuberances dispersed throughout the 2D layers can be attributed to the excess particulate formation of PDA or BSA clusters.

Chemical Composition, Defects, and Crystallinity of 3D Printed Aerogel

FIG. 13 presents the SEM images showing selected regions of GO nanosheets and G-PDA-BSA aerogels and their corresponding EDS spectra and elemental composition. The nitrogen/carbon mass ratio increased from 0.03 for GO to 0.12 for G-PDA-BSA, while the oxygen/carbon ratio decreased from 0.47 to 0.20, respectively. These changes in the elemental composition can be attributed to the presence of amine-containing functional groups in the biopolymers and the reduction of oxygen functional groups of GO that resulted in partially reduced GO (or rGO) in the G-PDA-BSA aerogel. The oxidative polymerization of PDA releases electrons which can also partially reduce the GO. Furthermore, BSA also reduces the GO with Tyrosine residues to restore the graphitic structure.

Figure 6:
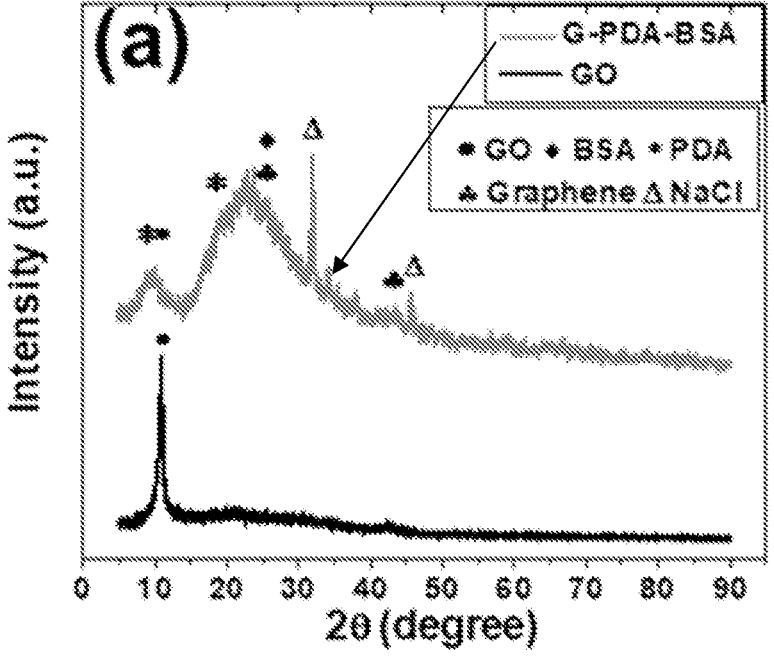
FIG. 6 shows (a) XRD, (b) Raman, (c) FTIR spectra, and (d) TGA curves of GO nanosheets and G-PDA-BSA aerogel.
Figure 6:
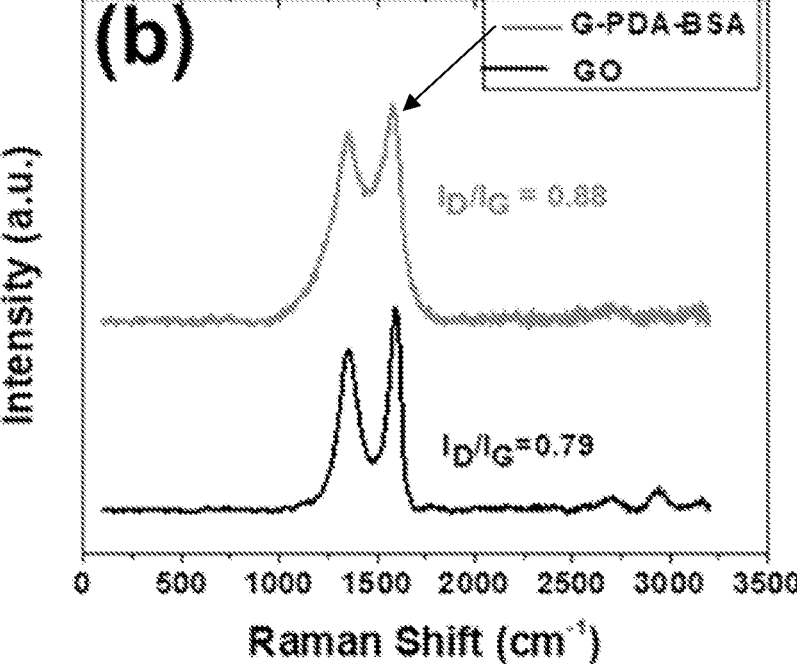
Figure 6:
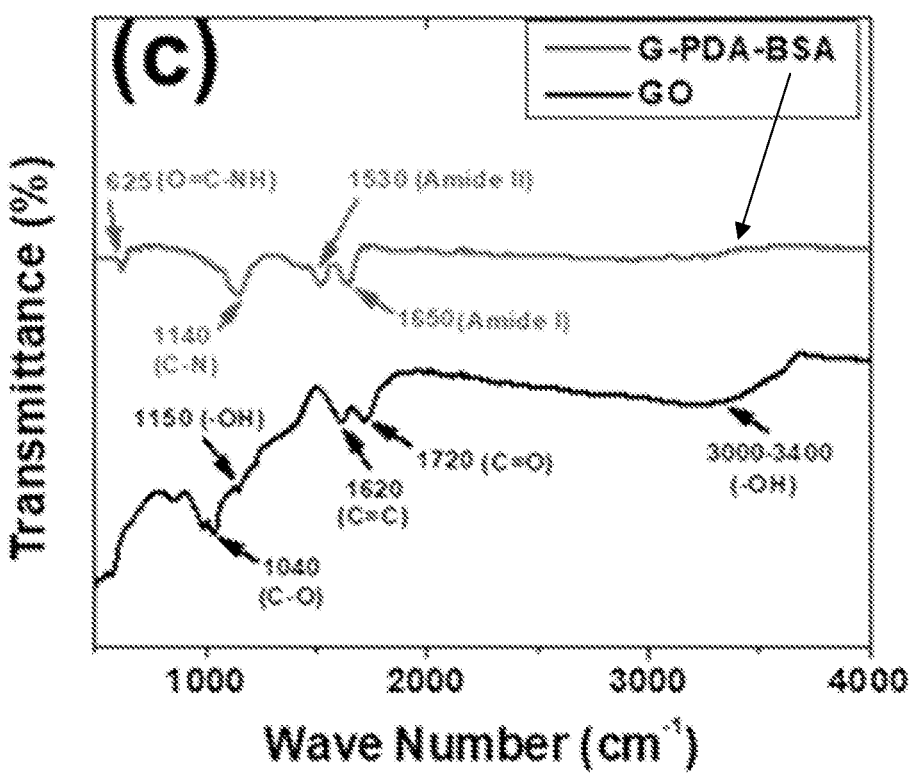
Figure 6:
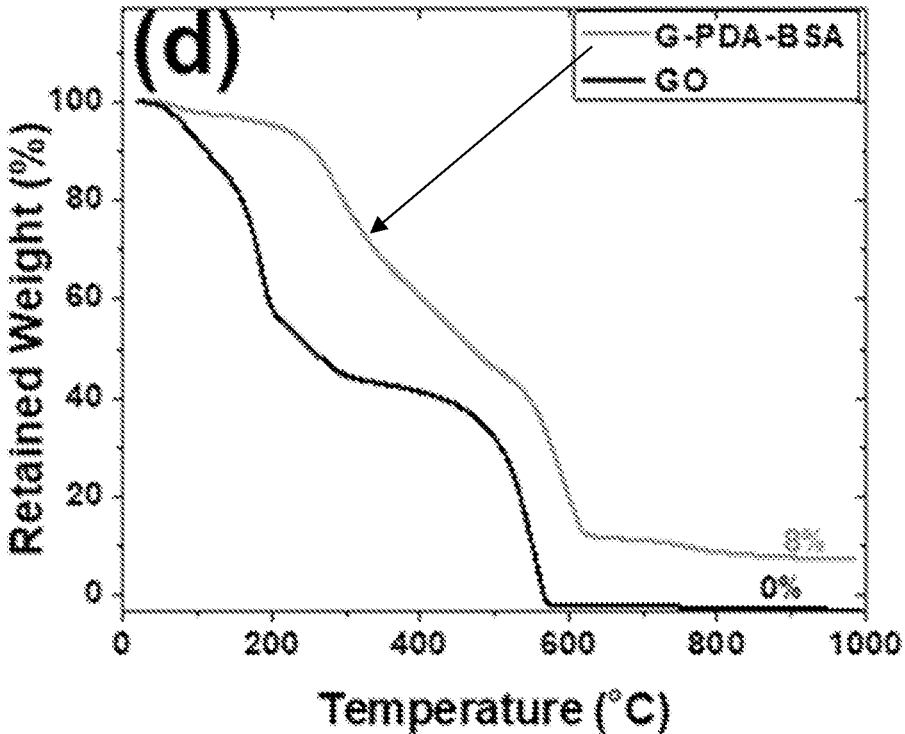

FIG. 6a presents the XRD spectra of GO and G-PDA-BSA. While the XRD spectrum of GO contains a sharp diffraction peak at 2θ=10.9° attributed to the oxidized graphitic sheets, this diffraction peak is diminished in the case of G-PDA-BSA aerogel. However, a characteristic peak from BSA at ~9.8° exists for G-PDA-BSA aerogel. The new broadened peak around $2\theta=23°$ in the spectra for the G-PDA-BSA aerogel can be attributed to cumulative contributions from graphitic carbon domains from BSA, reduced graphene oxide (rGO), and PDA. Overlapping of XRD peaks from reduced graphene oxide and PDA around $2\theta=25°$, and BSA around $2\theta=21°$ cause the peak to be flatter in this region for the aerogel. This further confirms the reduction of GO in the aerogel and replacement of oxygen functional groups by the PDA and BSA polymer.

Broader and slightly right-shifted signal contribution from BSA (at $28=9.8°$ and $2\theta=21°$) in the aerogel-compared to the reported signals of pristine BSA (at $2\theta=9°$ and $2\theta=19.5°$) can be attributed to denaturation of crystalline BSA while adsorbed on the surface of G-PDA. The peaks at $2\theta=32°$ and $2\theta=45.5°$ occur due to residual NaCl that is present in Tris buffer saline.

FIG. 6*b* presents the Raman spectra of the GO and G-PDA-BSA. Both spectra show the two major peaks at 1350 cm$^{-1}$ and 1600 cm$^{-1}$ representative of the graphitic domain (G-peak) and defects (D-peak), respectively, in the G-PDA-BSA aerogel. The $I_D/I_G$ ratio, which is a measure of disorder in the graphitic structure, increased from 0.79 for GO to 0.88 for G-PDA-BSA aerogel Such increase in the $I_D/I_G$ ratio in the aerogel can be attributed to sp$^3$ hybridization of graphene sheets and bonding with amine functional groups from PDA and BSA, hence, resulting in a more defected structure in the aerogel.

FIG. 6*c* presents the FTIR spectra of GO nanosheets and G-PDA-BSA aerogels. In the case of GO spectrum, peaks can be observed at 1040 cm$^{-1}$ (C—O—C stretching vibration), 1150 cm$^{-1}$ (—OH stretching vibration), 1720 cm$^{-1}$ (OH—C=O vibration), and 3000-3400 cm$^{-1}$ (phenolic hydroxyl groups), confirming the presence of different oxygen functional groups. In the case of G-PDA-BSA aerogel spectrum, the peaks at 1720 cm$^{-1}$ and 3000-3400 cm$^{-1}$ corresponding respectively to the vibration of —COOH and phenolic hydroxyl groups disappeared. The peaks corresponding to other oxygen functional groups associated with GO also exhibited relatively lower intensity in the case of aerogel. All of these confirm the reduction of GO in the G-PDA-BSA aerogel. There are new peaks at 1530 and 1650 cm$^{-1}$ for the aerogel, which can be attributed to —NH— stretching of amide I and amide II. Specifically, the peak at 1650 cm$^{-1}$ can be attributed to the reaction between carboxyl groups of GO and amine groups of PDA and BSA. The broad nature of the peak can be attributed to the hydrogen-bonded β-sheets (as presented with peak around 1620 cm$^{-1}$) formed due to denaturation during gelation of BSA. The in-plane vibration at 630 cm$^{-1}$ corresponding to O=C—NH also confirms the chemical bonding between GO and BSA.

FIG. 6*d* presents the results of thermogravimetric analysis (TGA) which explains the thermal stability of tested material. From TGA curve of GO, weight loss below 250° C. can be attributed to the decomposition of oxygen functional groups. The relatively better thermal stability for G-PDA-BSA below 250° C. suggests the absence of oxygen functional groups, thus, reduction of GO in the aerogel and also bonding between lamellar graphene sheets through amine groups. From 450-550° C., there is a sharp and total weight loss for GO denoting aggressive thermal oxidation of graphitic carbon. However, for G-PDA-BSA, the weight loss is gradual from 200-600° C. due to the presence of amorphous carbon from PDA and BSA. The residual mass of 8% for the aerogel is due to the char residue formed from PDA and BSA.

Contaminant Removal by 3D Printed Aerogel

The 3D printed G-PDA-BSA aerogel was tested for the removal of a wide array of aqueous contaminants including heavy metals, cationic and anionic dyes, and organic solvents. The monolithic aerogel was intact at the end of these removal tests, confirming its excellent mechanical strength and structural stability in aqueous solution. Moreover, the absence of BSA leached from the aerogel was also confirmed since no detectable concentration of BSA was found in DI water after soaking the G-PDA-BSA aerogel for 72 hours. Unfolding of hydrophobic sequences in BSA and subsequent gelation during the denaturation process can be attributed to the resistance against leaching of BSA. Such structural integrity of the G-PDA-BSA aerogels during use in contaminant removal process along with excellent aqueous stability is promising and showed the feasibility for using them in water treatment applications.

Heavy Metal and Dye Removal by 3D Printed Aerogels

Figure 7:
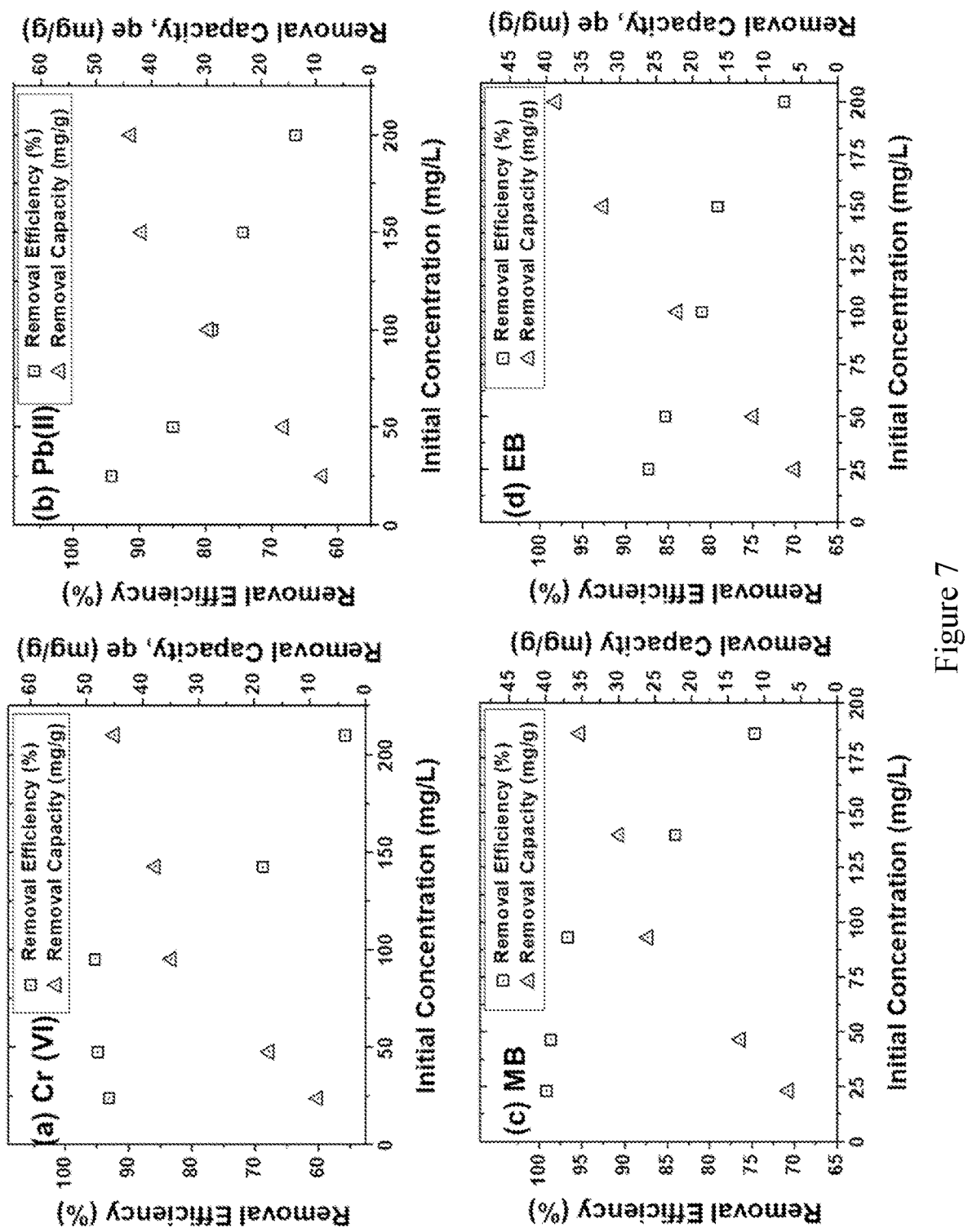
FIG. 7 shows (a) Cr (VI), (b) Pb (II), (c) MB and (d) EB removal performances of G-PDA-BSA aerogels at various initial concentrations of the contaminants. The pH remained unadjusted for these tests.

FIG. 7 presents the removal performances of G-PDA-BSA aerogels for batch adsorption of heavy metals and organic dyes tested at a range of their initial concentrations up to 200 ppm in water. The tested heavy metals include chromium (Cr (VI); FIG. 7*a*) and lead (Pb (II); FIG. 7*b*); and the tested dyes include cationic methylene blue (MB; FIG. 7*c*) and anionic Evans blue (EB; FIG. 7*d*). For heavy metals, the G-PDA-BSA aerogels showed the highest Cr (VI) and Pb (II) removal capacities of 45.05 and 43.76 mg/g, respectively, at their initial concentrations of 200 ppm and unregulated pH of 4.3 and ~5.3, respectively. As minimum heavy metal concentration is often desired in treated drinking water, the removal percentage is also an important parameter in addition to the removal capacity. The G-PDA-BSA aerogels performed the highest 93% and 94% removal of Cr (VI) and Pb (II) ions, respectively, at an initial concentration of 25 ppm. For organic dyes, the highest removal capacity for MB and EB were 35.33 and 38.73 mg/g, respectively, when the pH of the adsorbate was unregulated at 3.9 and 4.3, respectively, at their initial concentration of 200 ppm. The removal efficiencies for MB and EB, on the other hand, were 99.17% and 87.30%, respectively, at their initial concentration of 25 ppm, suggesting better removal percentages of MB than EB at a lower concentration.

Figure 16:
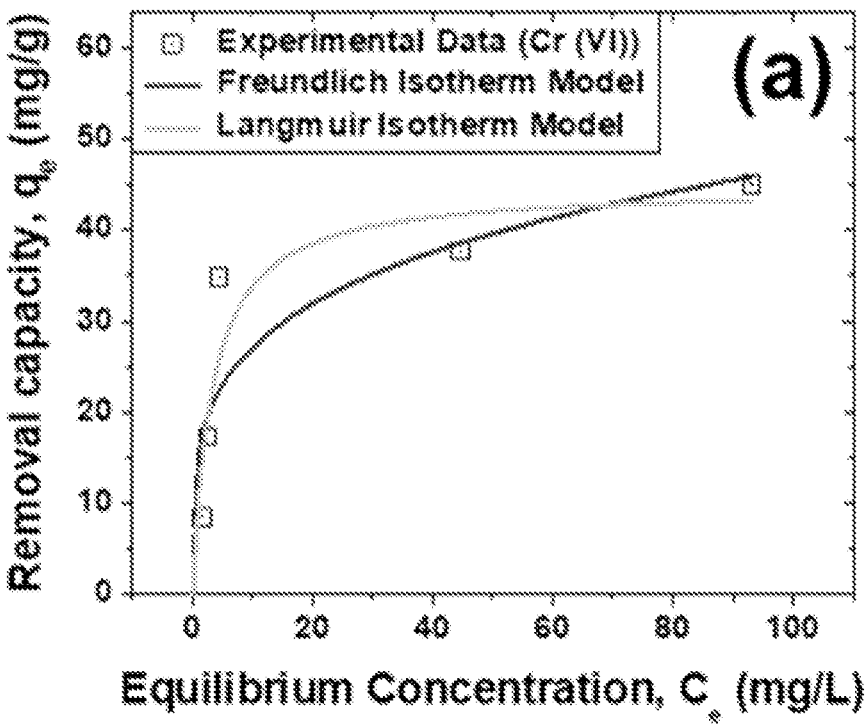
FIG. 16 shows equilibrium adsorption isotherms for (a) Cr (VI), (b) Pb (II), (c) MB, and (d) EB with fitted isotherm model curves.
Figure 16:
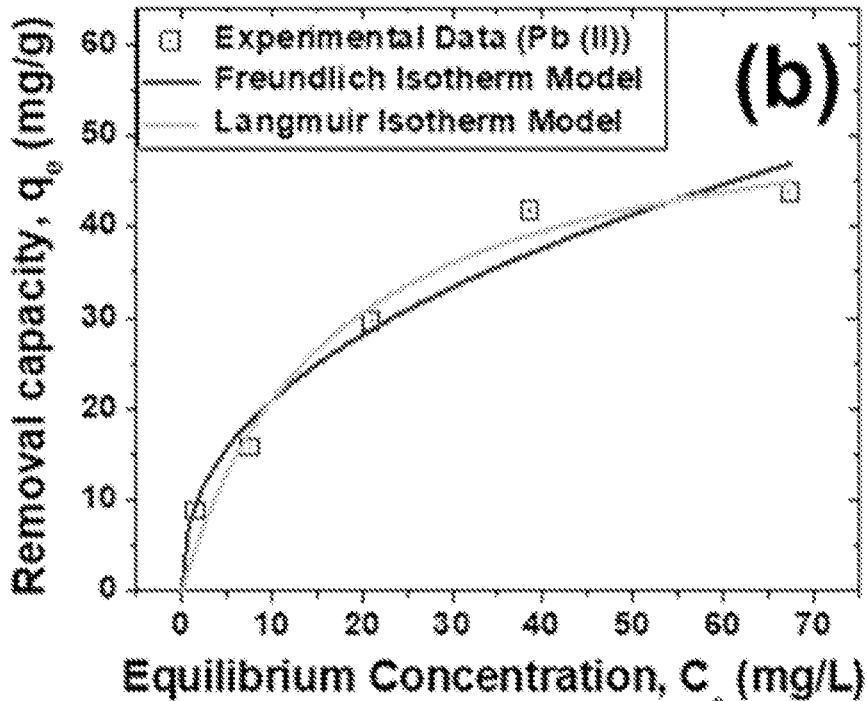
Figure 16:
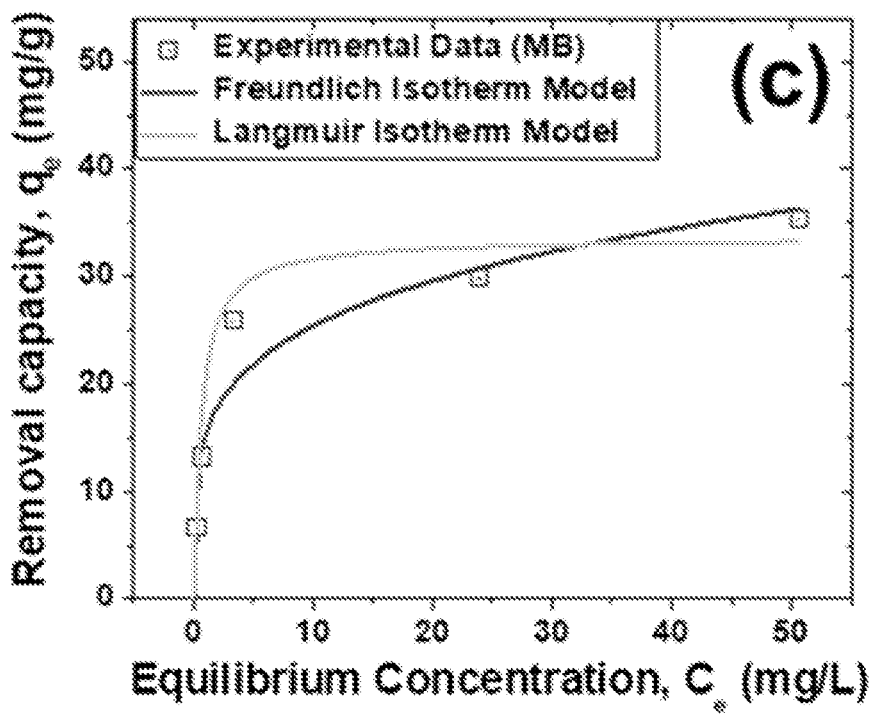
Figure 16:
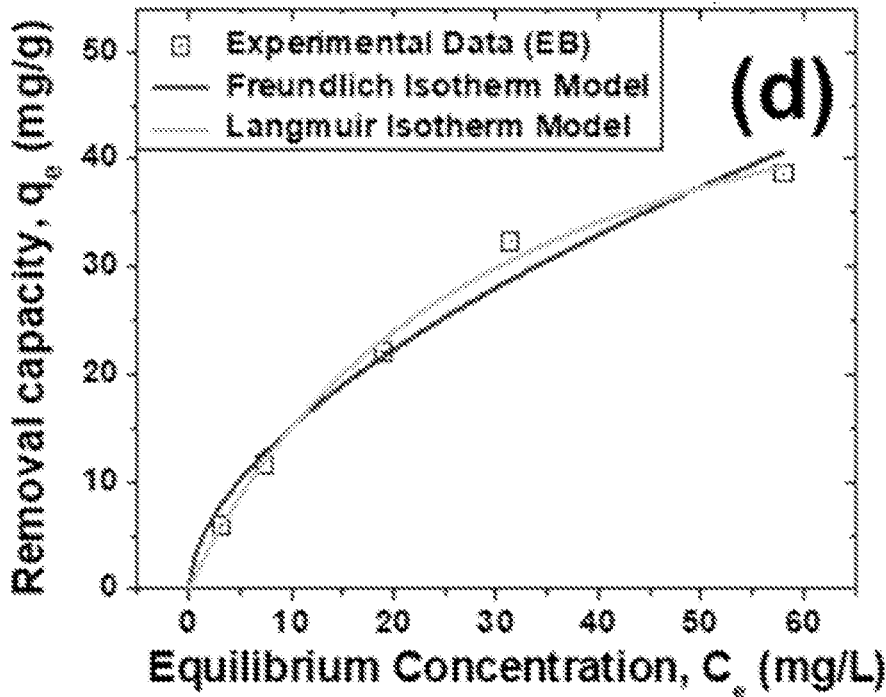

FIG. 16 presents the equilibrium adsorption isotherms for all four heavy metals and dyes, i.e., Cr(VI), Pb(II), MB, and EB by the G-PDA-BSA aerogel that were fitted with Langmuir and Freundlich adsorption isotherm model. The model parameters and adjusted R$^2$ values are summarized in Table 2 and 3. The equilibrium adsorption isotherms for all the contaminants were in better agreement with Langmuir model (adjusted R$^2$ value 0.79-0.99) compared to Freundlich model (adjusted R$^2$ value 0.65-0.96). This suggests monolayer adsorption of these contaminants on the G-PDA-BSA aerogel.

Effect of pH on the Contaminant Removal by 3D Printed Aerogels

Figure 8:
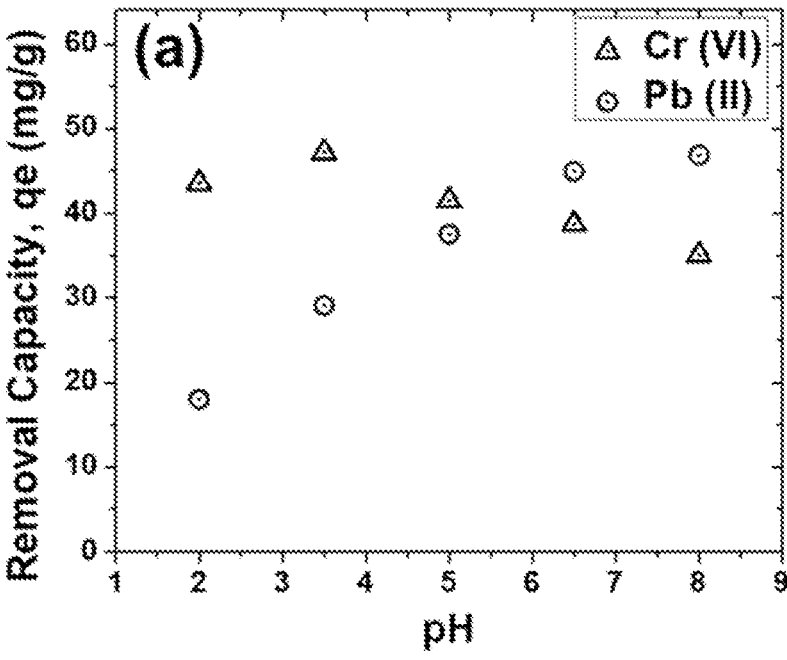
FIG. 8 shows removal capacities for (a) Cr (VI) and Pb (II), (b) MB and EB by the G-PDA-BSA aerogel at different pH and at an initial concentration 200 ppm.
Figure 8:
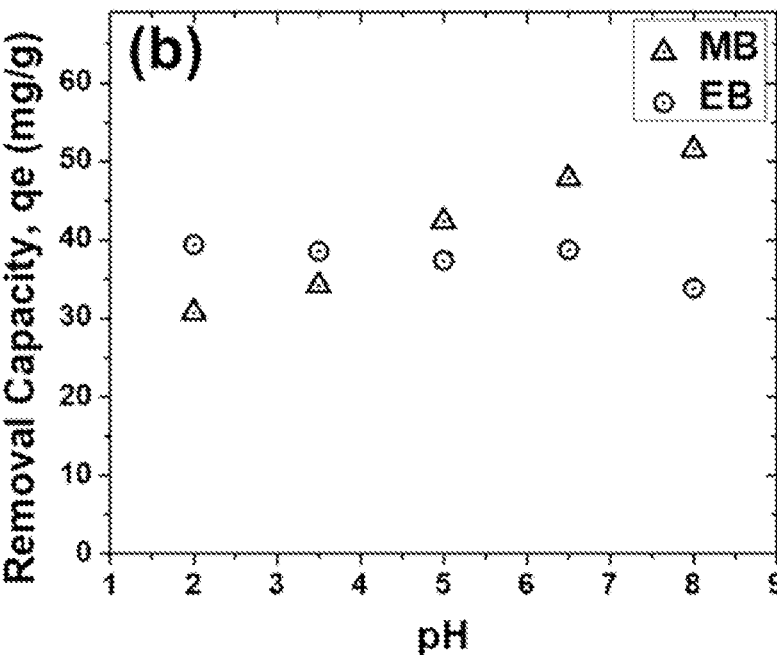

FIG. 8 presents the effect of pH on heavy metal and dye removal performance of the G-PDA-BSA aerogel for a pH range of 2-8 at their same initial concentration of 200 ppm. The pH range was kept below 8, as higher pH can cause hydrolysis and subsequent precipitation of heavy metal ions to form metal hydroxide before getting removed by the aerogel. Between the heavy metals, the removal capacity of G-PDA-BSA aerogel for Pb (II) increased almost linearly from 18 mg/g at pH=2 to 44.95 mg/g at pH=6.5 and the started to plateau. However, for Cr (VI), the removal capacity slightly increased from 43.56 mg/g at pH=2 to 47.23 mg/g at pH=3.5 and then decreased very slowly but linearly reaching a value of 35.08 mg/g at pH=8. Compared to the Pb (II) removal capacity which changed significantly with the pH change, the Cr (VI) removal capacity remained stable within the pH range.

In the case of dyes, similar to Pb (II), the removal capacity of cationic MB increased almost linearly from 30.75 mg/g at pH=2 to 51.53 mg/g at pH=8. However, for anionic EB, a slight decrease in the removal capacity was observed between acidic and alkaline pH. The removal capacities for EB were 39.36 mg/g at pH=2 and 33.81 mg/g at pH=8.

Mechanisms of Interactions Between Contaminants and 3D Printed Aerogels

Figure 9:
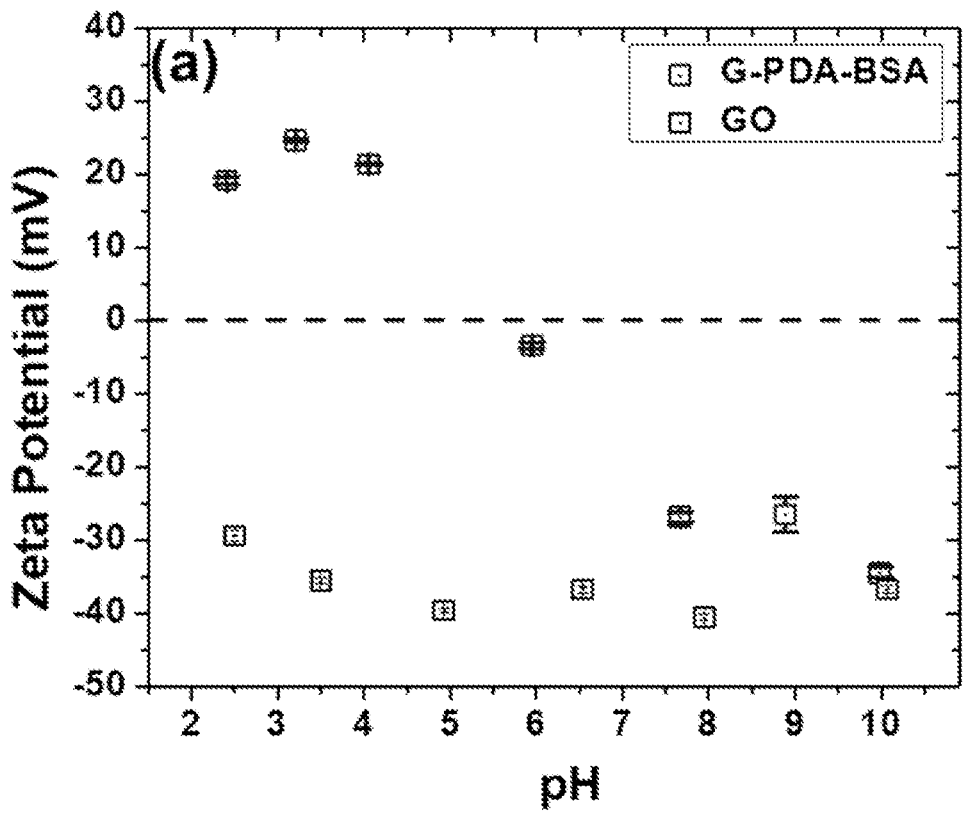
FIG. 9 shows (a) zeta potential values of GO nanosheets and G-PDA-BSA aerogel in aqueous media at different pH. (b) The removal capacity of GO powder and G-PDA-BSA aerogels normalized by their GO content for Cr (VI), Pb (II), MB, and EB. For all the contaminants, initial concentration=200 mg/L, adsorbent dose=10 mg, volume of adsorbate=15 mL.
Figure 9:
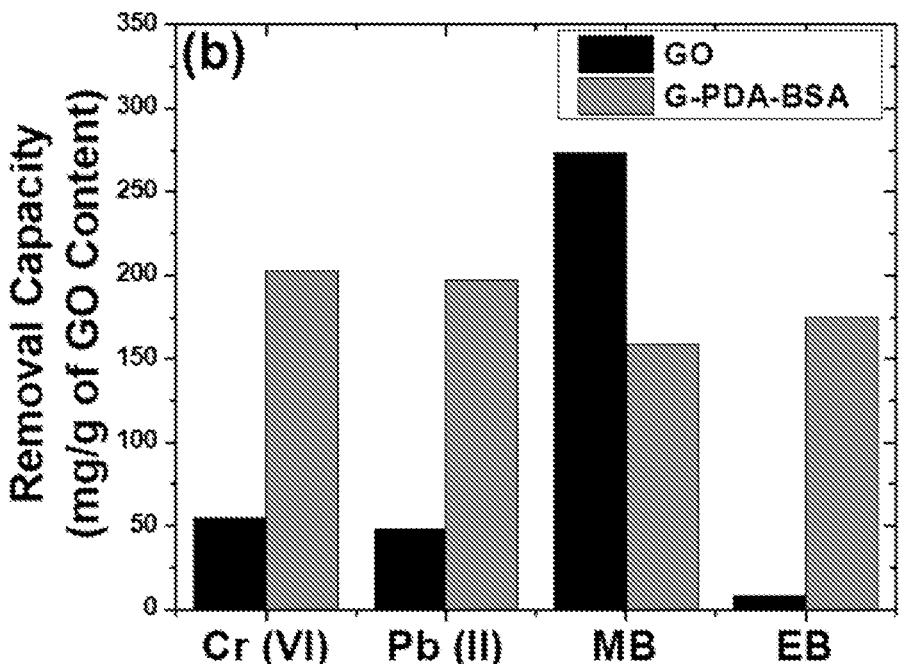

To elucidate the mechanisms of interactions between the contaminants and 3D printed aerogels, surface charge i.e., the zeta potential values of GO nanosheets and G-PDA-BSA aerogels were determined over a pH range of 2.5-10 and plotted in FIG. 9a. The surface of G-PDA-BSA aerogels was more positively charged than the precursor GO nanosheets. This can be attributed to the presence of amine functional groups of PDA and BSA in the aerogel. The zeta potential of the G-PDA-BSA aerogels decreased with increase of pH due to deprotonation of functional groups present in GO and in biopolymers and an isoelectric point was reached at pH=5.7. This suggests that at pH higher than 5.7, the G-PDA-BSA aerogel facilitated electrostatic attractions for the positively charged contaminants (at those pH) and subsequently resulted in their higher removal than in lower pH. This was further confirmed with Pb (II) and MB removal, as the more negatively charged surface of the aerogel at higher pH facilitated greater removal of positively charged $Pb^{2+}$ and MB ions with increase of pH. Some Pb (II) removal observed even at very low pH can be attributed to the complex formation with catechol or amino acid residues of PDA and BSA, respectively.

For MB, hydrophobic interaction with G-PDA-BSA aerogel contributed to their removal at low pH. However, at pH<8, the dominant aqueous species of Cr (VI) (e.g., $HCrO_4^-$, $Cr_2O_7^{2-}$) and EB are negatively charged. As a result, the Cr (VI) and EB removals do not increase with the increase of pH because of the interaction with the negatively charged G-PDA-BSA aerogel at increasing pH. However, the overall high Cr (VI) removal by the aerogel throughout the pH range can be attributed to protein-chromium complex formation as a removal mechanism. For EB, in addition to protein-mediated complexation, $\pi$-$\pi$ interaction with the G-PDA-BSA aerogel through a large number of aromatic rings also contributed to the high removal capacity for EB across the pH range.

Comparison Between the Removal Performance of GO Powder and 3D Printed Aerogel

The performance of 3D printed G-PDA-BSA aerogel could not be compared with that of a control 3D printed graphene aerogel because without the presence of PDA and BSA, GO dispersions were not printable. The contaminant removal performance of G-PDA-BSA aerogel was compared with that of GO nanosheets in powder form. The per gram cost of GO, PDA and BSA are ~195, 7, and 13 dollars, respectively. Considering the higher cost of GO, approximately 15-25 times compared to PDA and BSA, the performance of G-PDA-BSA and GO powders were normalized with GO content for comparison. When normalized by GO content, the contaminant removal capacity of G-PDA-BSA aerogels was greater compared to that of GO for chromium (~3.7 times), lead (~4.1 times), and EB (~20.2 times)—suggesting the merit of using PDA and BSA as additives for removing contaminants (FIG. 9b). However, the removal capacity of G-PDA-BSA aerogels for MB decreased by one-third compared to that of GO. As mentioned above, the positive surface charge of the G-PDA-BSA aerogel in pH lower than 5.7 causes electrostatic repulsion for the cationic MB and results in a lowered adsorption capacity. However, GO is known to be negatively charged at any pH (FIG. 9a) and causes electrostatic attractions for MB which results in higher adsorption of MB by GO than that by G-PDA-BSA.

Recycling Performance of 3D Printed Aerogels

The regeneration and reuse potential of the 3D printed G-PDA-BSA aerogels were tested by performing the separations of organic solvents and dyes from water. The tested organic solvents included n-hexane, n-heptane, and toluene while MB was used as the model dye. n-hexane and n-heptane are constituents of gasoline that are obtained from refining crude oil. Toluene is a byproduct of gasoline production. The aerogels were tested for the removal of n-hexane, n-heptane and toluene from the water interface. 300 µL of the organic solvents were added to water individually. Complete removal of all the organic solvents were achieved instantaneously (within ~5 seconds).

Figure 10:
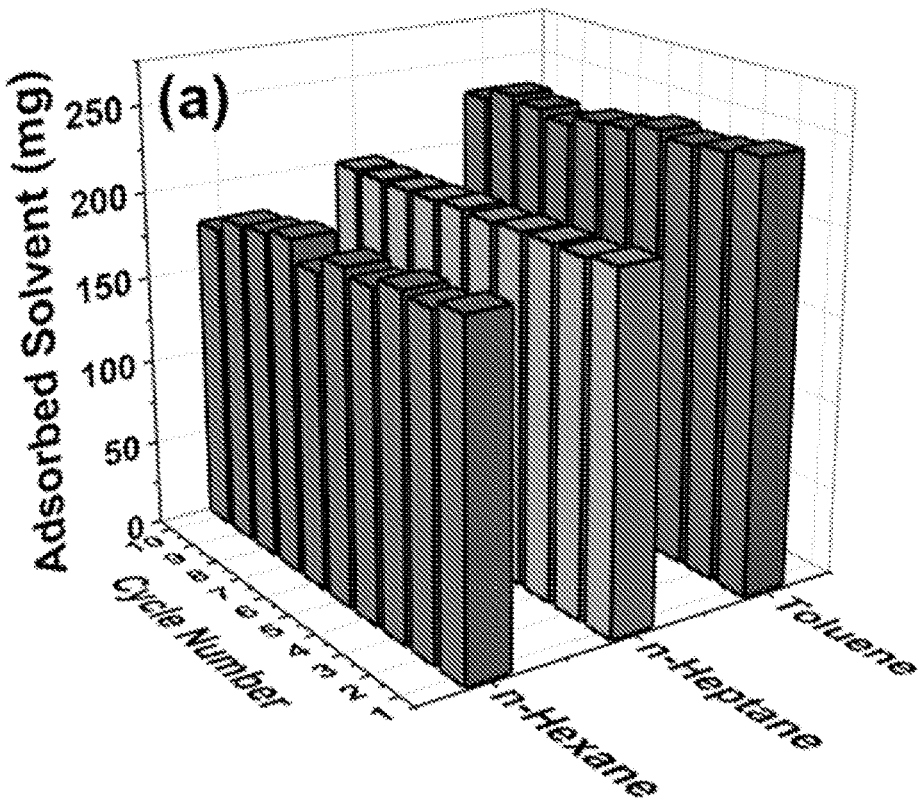
FIG. 10 shows. (a) n-hexane, n-heptane and toluene removal performance of G-PDA-BSA aerogel over 10 repetitive cycles. Initial volume for all the solvent were 300 µL. (b) MB removal performance of G-PDA-BSA aerogel for 3 repetitive cycles for different initial MB concentrations.
Figure 10:
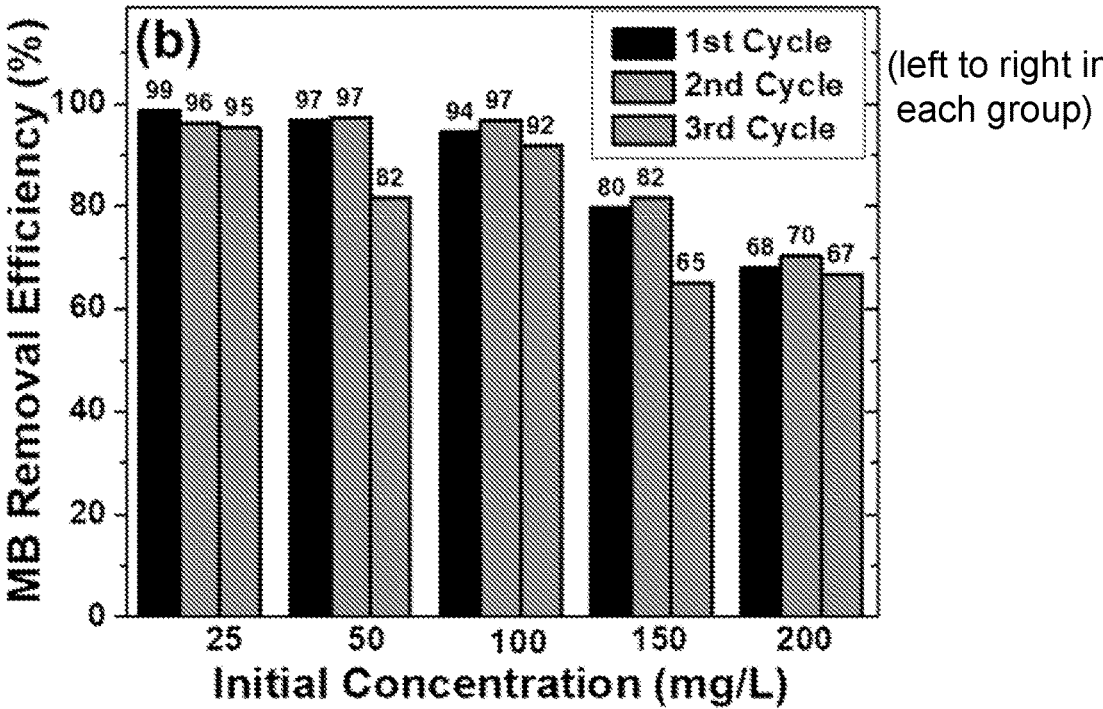
Figure 11:
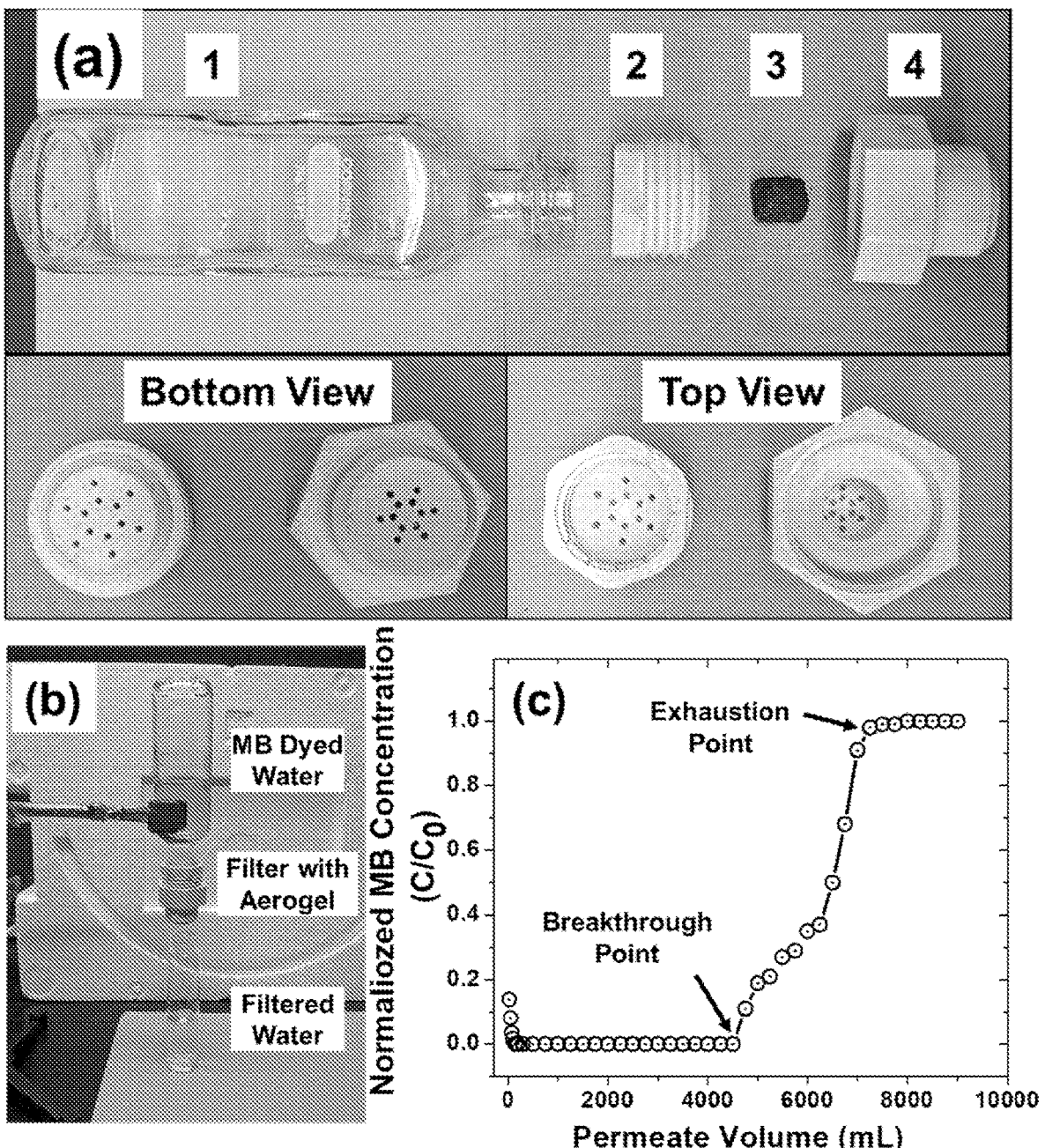
FIG. 11 shows (a) 3D printed parts of bottle-cap water filtration system, (b) flow-through experimental setup for the filtration of MB dyed water through the 3D Printed G-PDA-BSA aerogel (c) breakthrough curve for MB removal by G-PDA-BSA aerogel during the flow through experiment.

Total 10 adsorption-desorption cycles were performed for testing the regeneration and reuse ability of the aerogel for these organic solvents which yield their complete removal every time as shown in FIG. 10(a). The hydrophobic interaction between carbon-based backbone of the G-PDA-BSA aerogel and the organic solvents can be attributed to the fast adsorption of these non-polar organic solvents. In addition, the hydrophobic regions (from amino acid groups) of denatured BSA may contribute to the removal of these non-polar solvents. FIG. 10(b) presents the regeneration and reuse performance of G-PDA-BSA aerogels for MB removal for different initial concentrations up to 3 cycles. For MB initial concentrations of 25, 100, and 200 mg/L, the removal efficiencies decreased only slightly after the end of the third cycle; while for the MB concentrations of 50 and 150 mg/L, the removal efficiency in the third cycle decreased by 80% from the first cycle. Overall, 80-98% of the removal efficiency from the first cycle was retained after the third cycle. Both the results from the recycling of 3D printed G-PDA-BSA aerogels for the removal of organic solvents and MB confirm their potential for use as a regenerable adsorbent.

MB Removal by 3D Printed Aerogel in Flow-Through Filtration System

A continuous flow-through filtration study was performed to demonstrate the applicability of the fit-for-design 3D printed G-PDA-BSA aerogel as POU water filtration system. A 3D printed perforated bottle-cap filter system was used to encase and mount the cylindrical G-PDA-BSA aerogel adsorbent with 14 nm diameter and 14 nm height onto a water bottle (FIG. 8a). FIG. 8b and Movie S3 in supporting information present the filtration process through this 3D printed G-PDA-BSA aerogel-based bottle-cap filtration system. An aqueous solution of MB dye with a concentration of 1 ppm was flown through the filter under gravitational force and hydrostatic pressure. The average flow rate of the MB dyed water through the filter was measured to be 1.5 mL/minute under a constant hydrostatic pressure of 736 Pa. The MB removal performance of the filter system is expressed as breakthrough curve in FIG. 8c. More than 85% MB was removed by the filter immediately after the start of the experiment while 100% MB removal efficiency was achieved from after passing only 100 mL of water indicating a fast adsorption kinetics by the 3D printed aerogel. Furthermore, this 100% MB removal efficiency continued until the filter system reached breakthrough point after about 4750 mL (i.e., 4.75 L) of permeate flow and the filter system reached the exhaustion point after a flow of ~7000 mL (i.e., 7 L). The MB removal capacity of the G-PDA-BSA aerogel calculated from this flow-through filtration study was 31.66 mg/g which is close to the batch adsorption capacity of this aerogel for MB i.e., 35.33 mg/g. Overall, this demonstrates the potential ability of our 3D printed G-PDA-BSA aerogel to be employed as a POU filtration system for removing contaminants under flow-through conditions.

CONCLUSION

Herein, a DIW technique was used to 3D print and prepare graphene-biopolymer aerogels for testing their applicability for water treatment. The two biopolymers, PDA and BSA, not only provided an appropriate viscoelasticity to the graphene-based ink allowing DIW printability but also dictated the interactions between contaminants and the 3D printed aerogel by changing the surface chemistry and charge. The 3D printed graphene-biopolymer aerogel showed desirable regeneration and reuse potential that is beneficial for their long-term water treatment applications. Furthermore, the flow-through filtration study demonstrated the potential application of 3D printed graphene-biopolymer aerogels in point-of-use filters.

Shear Rate Calculation for Rotational Viscometer is calculated:

$$\text{Shear rate } (s^{-1}) = \frac{2\omega R_c^2 R_b^2}{X^2 (R_c^2 - R_b^2)} \qquad \text{(Equation 1)}$$

Where, $\omega$=angular velocity of spindle (rad/s)

$$\left[ = \frac{2\pi}{60} \cdot N \right],$$

Figure 12:
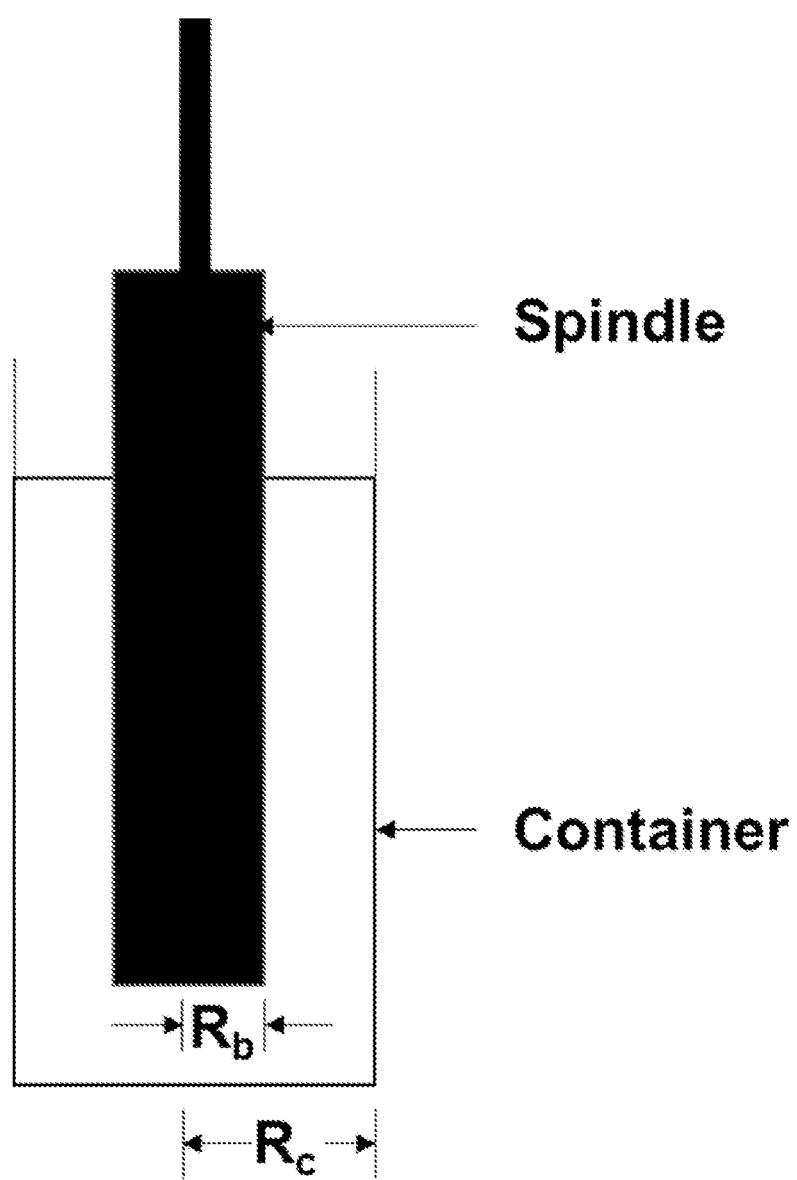
FIG. 12 shows a representation of where the various variables for a shear rate calculation for a rotational viscometer are obtained.

N=spindle rotation per minute (rpm) $R_c$=radius of container (mm) $R_b$=radius of the spindle X=radius at which shear rate is calculated (mm) (See FIG. 12).

TABLE 1

| Apparent viscosity of dispersions at different rotations of Rotational Viscometer | | | | |
|---|---|---|---|---|
| Rotation | Shear | Apparent viscosity (mPa · s) | | |
| (rpm) | rate (s⁻¹) | GO | G-PDA | G-PDA-BSA |
| 6 | 1.27 | 32 | 220 | 98300 |
| 12 | 2.54 | 28 | 130 | 49050 |

TABLE 1-continued

| Apparent viscosity of dispersions at different rotations of Rotational Viscometer | | | | |
|---|---|---|---|---|
| Rotation | Shear | Apparent viscosity (mPa · s) | | |
| (rpm) | rate (s⁻¹) | GO | G-PDA | G-PDA-BSA |
| 30 | 6.36 | 21 | 120 | 19140 |
| 60 | 12.71 | 17 | 44 | 9520 |

TABLE 2

| Expressions of isotherm models | | |
|---|---|---|
| Isotherm Model | Non-linear Expression | Parameters |
| Langmuir | $q_e = \dfrac{b q_m C_e}{1 + b C_e}$ | b = Langmuir isotherm Constant associated with energy of adsorption (L/mg) <br> $q_m$ = Maximum monolayer adsorption capacity (mg/g) |
| Freundlich | $q_e = K_f C_e^{\frac{1}{n}}$ | $K_f$ = Freundlich isotherm constant associated with adsorption capacity $(mg/g)(L/g)\frac{1}{n}$ <br> n = Freundlich isotherm constant associated with adsorption intensity |

Where, $q_e$ = Adsorption capacity at equilibrium (mg/g) (dependent variable)
$C_e$ = Equilibrium concentration in adsorbate (mg/L) (independent variable)

TABLE S3

| Values of Isotherm model parameters for different contaminants | | | | | | |
|---|---|---|---|---|---|---|
| | Langmuir Isotherm Model | | | Freundlich Isotherm Model | | |
| Contaminant | b (L/mg) | $q_m$ (mg/g) | Adjusted $R^2$ | $K_f$ $(mg/g)(L/g)\frac{1}{n}$ | n | Adjusted $R^2$ |
| Cr (VI) | 0.31 | 44.78 | 0.79 | 15.81 | 4.26 | 0.65 |
| Pb (II) | 0.06 | 55.96 | 0.95 | 7.97 | 2.38 | 0.94 |
| MB | 1.62 | 33.60 | 0.91 | 15.37 | 4.57 | 0.87 |
| EB | 0.03 | 59.41 | 0.99 | 4.10 | 1.77 | 0.96 |

Although the present disclosure has been described with respect to one or more particular examples, it will be understood that other examples of the present disclosure may be made without departing from the scope of the present disclosure.

The invention claimed is:

1. A printable gel composition comprising:
a graphene component;
polydopamine;
a carrier; and
optionally, one or more additional polymers chosen from alignates, chitosans, bovine serum albumin (BSA), and combinations thereof, wherein the polydopamine is non-covalently and/or covalently bound to the graphene component.

2. The printable gel composition of claim 1, wherein the printable gel composition has a minimum viscosity of 10,000 mPa·s.

3. The printable gel composition of claim 1, wherein the total polymer concentration of the polydopamine and, optionally, the one or more additional polymers is 8-12 weight percent (based on the total weight of the composition).

4. The printable gel composition of claim 1, wherein there is one or more additional polymers and the additional polymer is BSA, and wherein the polydopamine is present at a concentration of 1-1.5 weight percent (based on the total weight of the composition) and the BSA is present in the composition at a concentration of 7.5-8 weight percent (based on the total weight of the composition).

5. The printable gel composition of claim 1, further comprising a plurality of metal nanoparticles, metal oxide nanoparticles, or a combination thereof, wherein at least a portion of the metal nanoparticles and/or metal oxide nanoparticles are disposed on at least a portion of a surface or a plurality of surfaces of the graphene component and the metal nanoparticles and/or metal oxide nanoparticles are present at a concentration of 1-10 weight percent (based on the total weight of the composition).

6. The printable gel composition of claim 5, wherein the metal nanoparticles and/or metal oxide nanoparticles are redox active nanoparticles, photocatalysts, Noble metal catalysts, transition metals, rare earth metals, or multimetallic nanoparticles.

7. The printable gel composition of claim 6, wherein the redox active nanoparticles are chosen from iron nanoparticles, magnetite nanoparticles, hematite nanoparticles, and combinations thereof; the photocatalysts are chosen from, titanium dioxide nanoparticles, zinc oxide nanoparticles, and combinations thereof; the Noble metal catalysts are chosen from silver nanoparticles, gold nanoparticles, platinum nanoparticles, and combinations thereof; and the multimetallic nanoparticles are chosen from Fe/Ni nanoparticles, Au/Ni nanoparticles, Pt/Ni nanoparticles, Fe/Pd nanoparticles, Fe/Pt nanoparticles, Au/CeO$_2$ nanoparticles, Au/ZnO nanoparticles, Au/TiO$_2$ nanoparticles, Fe/TiO$_2$ nanoparticles, and combinations thereof.

8. The printable gel composition of claim 1, wherein the graphene component is chosen from single layer graphene, multilayer graphene, single layer graphene oxide, multilayer graphene oxide, single layer surface-modified graphene oxide, multilayer surface-modified graphene oxide, reduced graphene oxide, partially reduced graphene oxide, and combinations thereof.

9. The printable gel composition of claim 1, wherein the graphene component is present at a concentration of 0.5-5 weight percent (based on the total weight of the composition).

10. The printable gel composition of claim 1, wherein the printable gel composition has a pH of 7.5-9.

11. The printable gel composition of claim 1, wherein the carrier is chosen from water, one or more organic solvent, and a combination thereof, wherein the one or more organic solvent is chosen from polar aprotic solvents, polar protic solvents, and combinations thereof and the polar aprotic solvents are chosen from dimethylformamide (DMF N-methyl-2-pyrrolidone (NMP), and combinations thereof and the polar protic solvents are chosen from alcohols, ionic liquids, deep eutectic solvents, and combinations thereof.

* * * * *